US012587731B2

(12) United States Patent
Kudo et al.

(10) Patent No.: US 12,587,731 B2
(45) Date of Patent: Mar. 24, 2026

(54) INFORMATION PROCESSING APPARATUS, MOBILE MACHINE, IMAGE CAPTURING SYSTEM, IMAGE CAPTURING CONTROL METHOD, AND PROGRAM

(71) Applicants: Koichi Kudo, Kanagawa (JP); Aiko Ohtsuka, Tokyo (JP); Masuyoshi Yachida, Tokyo (JP); Hanako Bando, Ibaraki (JP)

(72) Inventors: Koichi Kudo, Kanagawa (JP); Aiko Ohtsuka, Tokyo (JP); Masuyoshi Yachida, Tokyo (JP); Hanako Bando, Ibaraki (JP)

(73) Assignee: RICOH COMPANY, LTD., Tokyo (JP)

( * ) Notice: Subject to any disclaimer, the term of this patent is extended or adjusted under 35 U.S.C. 154(b) by 107 days.

(21) Appl. No.: 18/029,096

(22) PCT Filed: Sep. 3, 2021

(86) PCT No.: PCT/JP2021/032442
§ 371 (c)(1),
(2) Date: Mar. 29, 2023

(87) PCT Pub. No.: WO2022/070767
PCT Pub. Date: Apr. 7, 2022

(65) Prior Publication Data
US 2024/0022806 A1 Jan. 18, 2024

(30) Foreign Application Priority Data
Sep. 30, 2020 (JP) ................................ 2020-165537
Jul. 15, 2021 (JP) ................................ 2021-117332

(51) Int. Cl.
*H04N 23/61* (2023.01)
*G06V 10/74* (2022.01)
(Continued)

(52) U.S. Cl.
CPC ............. *H04N 23/61* (2023.01); *G06V 10/74* (2022.01); *G06V 20/50* (2022.01); *H04N 23/695* (2023.01); *H04N 23/90* (2023.01)

(58) Field of Classification Search
CPC ...... H04N 23/61; H04N 23/695; H04N 23/90; H04N 7/185; H04N 23/62; H04N 23/64;
(Continued)

(56) References Cited

U.S. PATENT DOCUMENTS

2005/0088543 A1 4/2005 Yoshii
2009/0043422 A1 2/2009 Lee et al.
(Continued)

FOREIGN PATENT DOCUMENTS

JP 11-064050 3/1999
JP 2005-052926 3/2005
(Continued)

OTHER PUBLICATIONS

Extended European Search Report issued Oct. 8, 2024 in corresponding European Patent Application No. 21875069.3. (14 pgs).
(Continued)

*Primary Examiner* — Christopher K Peterson
(74) *Attorney, Agent, or Firm* — XSENSUS LLP

(57) ABSTRACT

An information processing apparatus for controlling an image capturing process for a robot that moves in a predetermined site to capture an image of a target object. The information processing apparatus includes a memory that stores a plurality of reference images that are captured images of the target object installed in the site, the captured images being obtained at a specific image capturing position and showing different appearances of the target object, such that each of the plurality of reference images is associated with an image capturing condition of the target object. Further, there is an image capturing control unit that captures
(Continued)

an image of the target object by using the robot moved to the specific image capturing position, and an image capturing condition setting unit that sets an image capturing condition of the target object, based on the captured image of the target object and the stored reference images.

14 Claims, 33 Drawing Sheets

(51) Int. Cl.
*G06V 20/50* (2022.01)
*H04N 23/695* (2023.01)
*H04N 23/90* (2023.01)

(58) Field of Classification Search
CPC ........ H04N 23/69; G06V 10/74; G06V 20/50; G06T 7/74; G06T 2207/10021; G06T 2207/10024; G06T 2207/10028; G06T 2207/10048; G06T 2207/20081; G06T 2207/20084; G06T 2207/30244
See application file for complete search history.

(56) References Cited

U.S. PATENT DOCUMENTS

2011/0188779 A1 8/2011 Sakanaga et al.
2017/0061209 A1 3/2017 Watanabe
2017/0272623 A1 9/2017 Yachida et al.
2017/0303466 A1* 10/2017 Grufman .................. G06T 7/80
2019/0335074 A1 10/2019 Malkes et al.
2020/0252543 A1* 8/2020 Lanka ................. H04N 23/632
2021/0001487 A1 1/2021 Ohtsuka et al.
2021/0037214 A1 2/2021 Itoh

FOREIGN PATENT DOCUMENTS

JP 2005-130326 5/2005
JP 2007-264832 A 10/2007
JP 2009-239501 10/2009
JP 2011-163766 8/2011
JP 2017-045166 3/2017
JP 2021-027390 2/2021

OTHER PUBLICATIONS

Merriaux Pierre et al: "The VIKINGS Autonomous Inspection Robot: Competing in the ARGOS Challenge", IEEE Robotics & Automation Magazine, IEEE Service Center, Piscataway, NJ, US, vol. 26, No. 1, Mar. 1, 2019 (Mar. 1, 2019), pp. 21-34, XP011713838.
Binhai Wang et al: "SmartGuard: An autonomous robotic system for inspecting substation equipment", Journal of Field Robotics, vol. 29, No. 1, Nov. 16, 2011 (Nov. 16, 2011), pp. 123-137, XP055471462.
International Search Report and Written Opinion issued on Nov. 9, 2021 in PCT/JP2021/032442 filed on Sep. 3, 2021, 5 pages.

* cited by examiner

FIG. 11

AREA INFORMATION MANAGEMENT TABLE

| AREA ID | AREA NAME | AREA REFERENCE POSITION |
|---|---|---|
| a001 | AREA 1 | P8, P10 |
| a002 | AREA 2 | P14, P16 |
| a003 | AREA 3 | P11, P9 |
| a004 | AREA 4 | P7, P15 |
| ... | ... | ... |

FIG. 12

SITE POSITION MANAGEMENT TABLE

| SITE POSITION ID | POSITION INFORMATION |
|---|---|
| P0 | (7,13) |
| P1 | (11,36) |
| P2 | (11,65) |
| P3 | (11,117) |
| P4 | (11,150) |
| ... | ... |

FIG. 13

ROUTE INFORMATION MANAGEMENT TABLE

| ROUTE ID | AREA ID | ROUTE DATA |
|---|---|---|
| R002 | a001 | P0→P1→P2→P3→P4→P8→P10→P8→P4→P3→P2→P1→P0 |
| R002 | a001<br>a002 | P0→P1→P2→P3→P4→P8→P10→P12→P14→P16→P18→P16→P14→P10→P8→P4→P3→P2→P1→P0 |
| R003 | a001<br>a002<br>a003<br>a004 | P0→P1→P2→P3→P4→P8→P10→P12→P14→P16→P18→P19→P20→P21→P17→P15→P13→P11→P9→P7→P6→P5→P4→P3→P2→P1→P0 |
| ... | ... | ... |

FIG. 14

TARGET OBJECT MANAGEMENT TABLE

AREA ID: a002

AREA ID: a001

| TARGET OBJECT ID | TARGET OBJECT NAME | IMAGE CAPTURING POSITION |
|---|---|---|
| S1 | TEST OBJECT | (24,150) |
| M1 | METER 1 | – |
| M2 | METER 2 | – |
| M3 | METER 3 | – |
| ... | ... | ... |

FIG. 15

PATTERN MANAGEMENT TABLE

| PATTERN ID | PATTERN NAME | REFERENCE IMAGE DATA |
|---|---|---|
| P001 | PATTERN 1 | test01.jpeg |
| P002 | PATTERN 2 | test02.jpeg |
| P003 | PATTERN 3 | test03.jpeg |
| ... | ... | ... |

FIG. 16

IMAGE CAPTURING CONDITION MANAGEMENT TABLE

AREA ID: a001

| PATTERN ID | TARGET OBJECT ID | IMAGE CAPTURING POSITION | | PAN P (°) | TILT T (°) | ZOOM Z (MAGNIFICATION) |
|---|---|---|---|---|---|---|
| | | IMAGE CAPTURING POINT | REFERENCE POSITION DISTANCE X(m) | | | |
| P001 | M1 | A1 (52,150) | 1 | 0 | 10 | 5 |
| P001 | M2 | ... | ... | ... | ... | ... |
| P001 | M3 | ... | ... | ... | ... | ... |
| P002 | M1 | A2 (81,150) | 1.5 | 10 | 10 | 5.5 |
| P002 | M2 | ... | ... | ... | ... | ... |
| P002 | M3 | ... | ... | ... | ... | ... |
| P003 | M1 | A3 (115,150) | 2 | 20 | 10 | 6 |
| P003 | M2 | ... | ... | ... | ... | ... |
| P003 | M3 | ... | ... | ... | ... | ... |
| ... | ... | ... | ... | ... | ... | ... |

FIG. 17

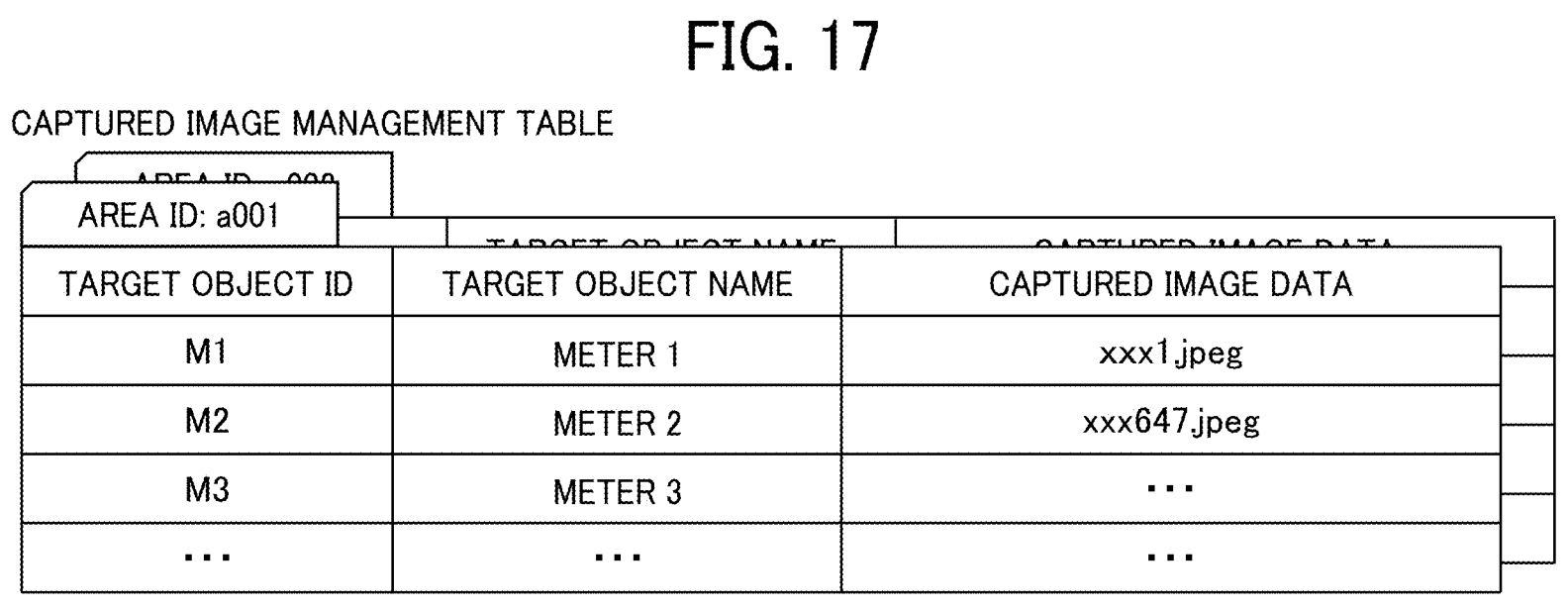

CAPTURED IMAGE MANAGEMENT TABLE

AREA ID: a001

| TARGET OBJECT ID | TARGET OBJECT NAME | CAPTURED IMAGE DATA |
|---|---|---|
| M1 | METER 1 | xxx1.jpeg |
| M2 | METER 2 | xxx647.jpeg |
| M3 | METER 3 | ... |
| ... | ... | ... |

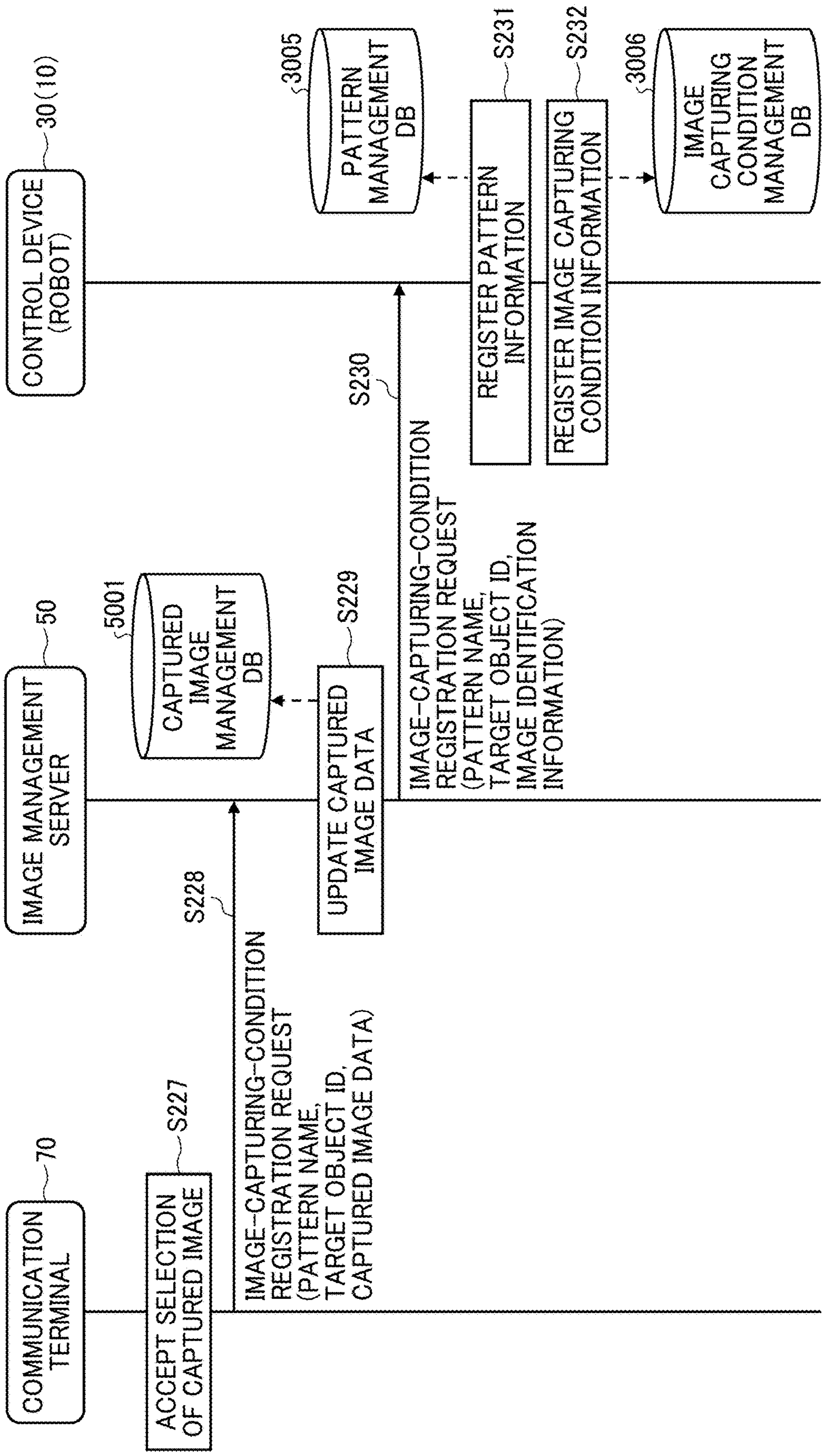

FIG. 34

COMMUNICATION TERMINAL — 70

IMAGE MANAGEMENT SERVER — 50

CONTROL DEVICE (ROBOT) — 30 (10)

ACCEPT SELECTION OF CAPTURED IMAGE — S227

IMAGE-CAPTURING-CONDITION REGISTRATION REQUEST
(PATTERN NAME,
TARGET OBJECT ID,
CAPTURED IMAGE DATA) — S228

CAPTURED IMAGE MANAGEMENT DB — 5001

UPDATE CAPTURED IMAGE DATA — S229

IMAGE-CAPTURING-CONDITION REGISTRATION REQUEST
(PATTERN NAME,
TARGET OBJECT ID,
IMAGE IDENTIFICATION INFORMATION) — S230

PATTERN MANAGEMENT DB — 3005

REGISTER PATTERN INFORMATION — S231

REGISTER IMAGE CAPTURING CONDITION INFORMATION — S232

IMAGE CAPTURING CONDITION MANAGEMENT DB — 3006

IMAGE OBTAINED AT IMAGE CAPTURING POINT A3

IMAGE OBTAINED AT IMAGE CAPTURING POINT A4

INFORMATION PROCESSING APPARATUS, MOBILE MACHINE, IMAGE CAPTURING SYSTEM, IMAGE CAPTURING CONTROL METHOD, AND PROGRAM

CROSS-REFERENCE TO RELATED APPLICATIONS

The present application is based on PCT filing PCT/JP2021/032442, filed Sep. 3, 2021, which claims priority to Japanese Patent Application No. 2020-165537, filed on Sep. 30, 2020, and Japanese Patent Application No. 2021-117332, filed on Jul. 15, 2021, the entire contents of each are incorporated herein by its reference.

TECHNICAL FIELD

The present invention relates to an information processing apparatus, a mobile machine, an image capturing system, an image capturing control method, and a program.

BACKGROUND ART

A robot is known, which is installed at a site such as a factory or a warehouse and is autonomously movable within the site. Such a robot is used as an inspection robot or a service robot, for example, and can perform the work of inspecting equipment within the site on behalf of a human worker. PTL 1 discloses a monitoring system in which a human worker can simply operate a mobile machine along an inspection route to monitor and inspect equipped devices, pipes, and so on.

Also known is a system for inspection work using a robot. In such a system, images of inspection target objects are captured with the robot moving. A method for automatically adjusting a position or the like at which an image of an inspection target object is to be captured is disclosed in PTL 2. In the disclosed method, in the inspection of a workpiece based on images of the workpiece, which are captured by a camera at a plurality of inspection points set for the workpiece while the camera is sequentially moved to the plurality of inspection points, the positions of the plurality of inspection points are taught by using point-of-view information on a display screen.

CITATION LIST

Patent Literature

[PTL 1]
Japanese Unexamined Patent Application Publication No. 11-64050
[PTL 2]
Japanese Unexamined Patent Application Publication No. 2005-52926

SUMMARY OF INVENTION

Technical Problem

However, the existing method has a problem in that even if image capturing conditions are taught in advance, images of a target object may be captured in different manners even from the same image capturing position depending on the image capturing time or the image capturing environment such as the weather, and a captured image that is difficult for an administrator or the like who checks the target object to check the state of the target object may be acquired.

Solution to Problem

To address the problem described above, an invention according to claim 1 provides an information processing apparatus for controlling an image capturing process for a mobile machine that moves in a predetermined site to capture an image of a target object. The information processing apparatus includes storage means for storing a plurality of reference images that are captured images of the target object installed in the site, the captured images being obtained at a specific image capturing position and showing different appearances of the target object, such that each of the plurality of reference images is associated with an image capturing condition of the target object, image capturing control means for capturing an image of the target object by using the mobile machine moved to the specific image capturing position, and image capturing condition setting means for setting an image capturing condition of the target object, based on the captured image of the target object and the stored reference images. The image capturing control means captures an image of the target object by using the set image capturing condition.

Advantageous Effects of Invention

The present invention achieves the advantage of acquiring a captured image from which the state of a target object can be checked, regardless of the image capturing environment.

BRIEF DESCRIPTION OF DRAWINGS

FIG. 11 is a conceptual diagram illustrating an example of an area information management table.

FIG. 12 is a conceptual diagram illustrating an example of a site position management table.

FIG. 13 is a conceptual diagram illustrating an example of a route information management table.

FIG. 14 is a conceptual diagram illustrating an example of a target object management table.

FIG. 15 is a conceptual diagram illustrating an example of a pattern management table.

FIG. 16 is a conceptual diagram illustrating an example of an image capturing condition management table.

FIG. 17 is a conceptual diagram illustrating an example of a captured image management table.

FIG. 34 is a sequence diagram illustrating an example of an image capturing condition registration process in the image capturing system.

DESCRIPTION OF EMBODIMENTS

Figure 1:
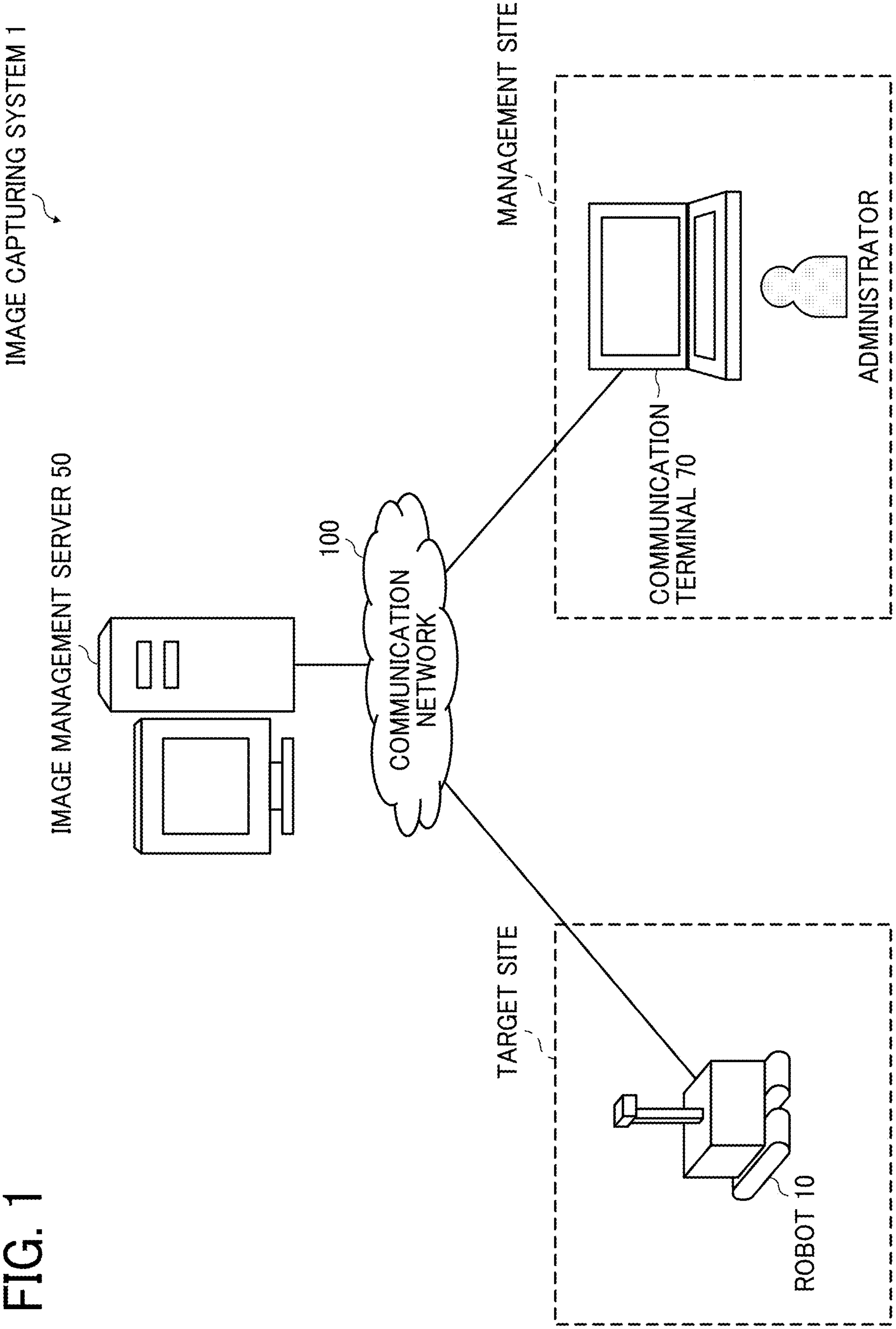
FIG. 1 is a diagram illustrating an example of the general arrangement of an image capturing system.

Embodiments of the present invention will be described hereinafter with reference to the drawings. In the description of the drawings, the same elements are denoted by the same reference numerals, and redundant descriptions thereof will be omitted.

Embodiment

System Configuration

FIG. 1 is a diagram illustrating an example of the general arrangement of an image capturing system. An image capturing system 1 illustrated in FIG. 1 is a system for capturing an image of an inspection target object installed at a target site by using a robot 10 to perform inspection for any abnormality.

The image capturing system 1 includes the robot 10, which is located at a predetermined target site, an image management server 50, and a communication terminal 70. The robot 10, the image management server 50, and the communication terminal 70 of the image capturing system 1 can communicate with each other via a communication network 100. The communication network 100 is implemented by the Internet, a mobile communication network, a local area network (LAN), or the like. The communication network 100 may include a network by not only wired communications but also a network by wireless communications such as 3rd generation (3G), 4th generation (4G), 5th generation (5G), Wireless Fidelity (Wi-Fi®), Worldwide Interoperability for Microwave Access (WiMAX), or Long Term Evolution (LTE).

The robot 10 is a mobile machine that is installed at the target site and autonomously travels within the target site. The robot 10 executes inspection work for an installed inspection target object while moving within the target site. Further, the robot 10 transmits an image captured during the inspection work to the communication terminal 70 to provide information (such as an image) on an inspection result to an administrator who uses the communication terminal 70 at the target site.

The image management server 50 is a server computer for managing an image of the inspection target object, which is captured by the robot 10. The image management server 50 stores and manages a captured image transmitted from the robot 10 and provides the captured image to the communication terminal 70 used by the administrator.

The image management server 50 may be configured by a single computer or a plurality of computers to which portions (functions or means) of the image management server 50 are allocated as appropriate. All or some of the functions of the image management server 50 may be implemented by a server computer residing in a cloud environment or a server computer residing in an on-premises environment.

The communication terminal 70 is a computer such as a notebook personal computer (PC) used by the administrator who manages the inspection target object or the robot 10 installed at the target site. The administrator views a captured image of the inspection target object, which is captured by the robot 10, at the management site, such as an office, to check the execution result of the inspection work. The administrator may further remotely operate the robot 10 while watching an image of the target site displayed on the communication terminal 70. The communication terminal 70 is not limited to the notebook PC, and may be, for example, a desktop PC, a tablet terminal, a smartphone, a wearable terminal, or the like.

Overview

Figure 2:
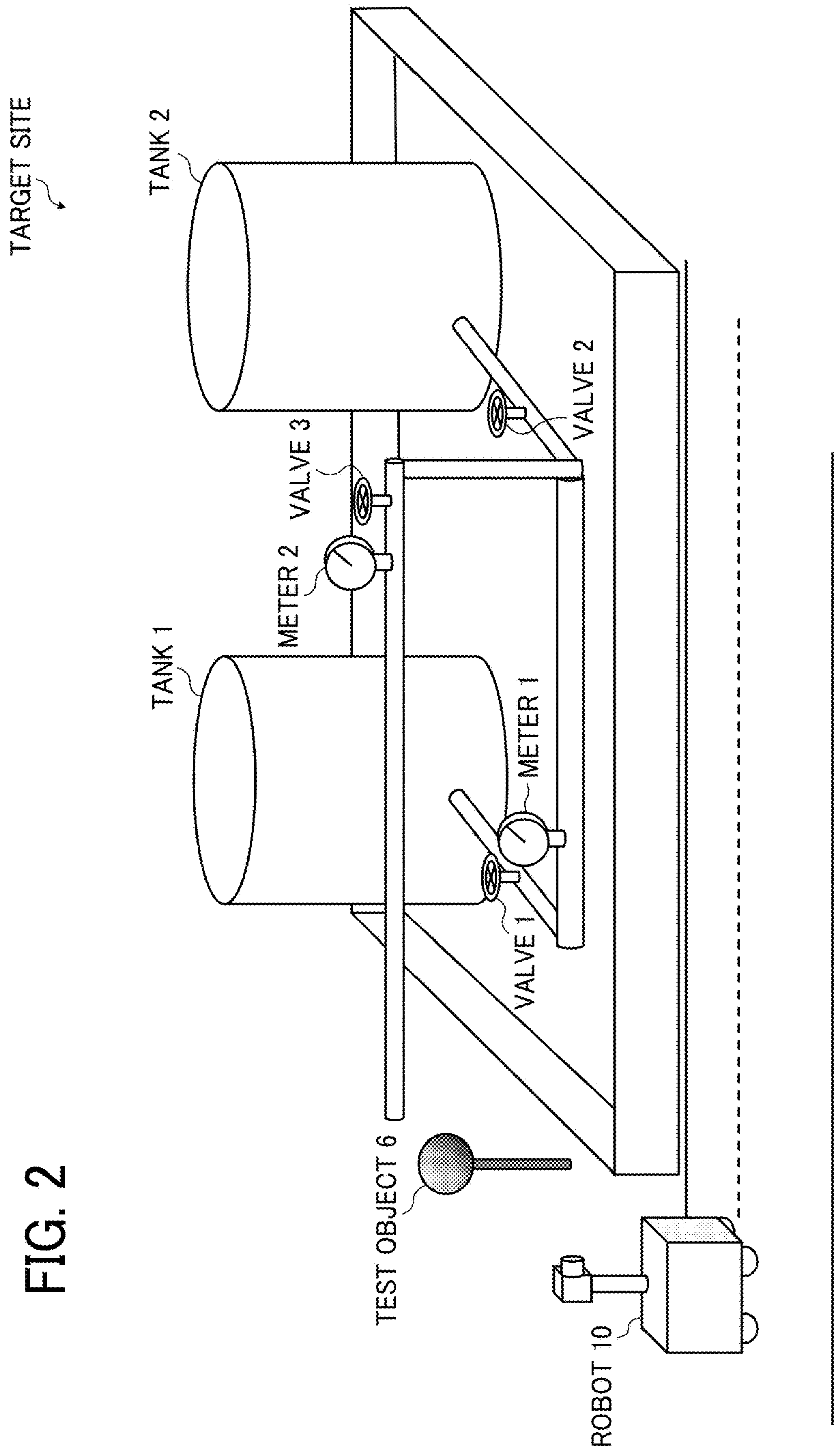
FIG. 2 is a view schematically illustrating an example of a target site where a robot is installed.

The target site where the robot 10 is installed will now be described with reference to FIG. 2. FIG. 2 is a view schematically illustrating an example of the target site where the robot 10 is set. In FIG. 2, for example, an outdoor facility having a large site area, such as a plant factory, is illustrated as an example of the target site. A plurality of inspection target objects that require maintenance and management such as daily inspection or periodic inspection are present at the target site illustrated in FIG. 2. For example, when the target site is a plant factory, the inspection target objects are storage-tank measurement meters (meter 1 and meter 2), storage tanks (tank 1 and tank 2), valves (valve 1, valve 2, and valve 3) of the storage tanks, tanker vehicles that carry liquids to the storage tanks, and the like.

The robot 10 autonomously travels and moves within the target site and executes a process of capturing images of the inspection target objects at predetermined positions. The robot 10 may move within the target site by using technology such as line tracing or by using remote control from the communication terminal 70. A test object 6, which is different from the inspection target objects, is also installed at the target site. The test object 6 is an object installed such that an image of the test object 6 is captured immediately before images of the inspection target objects at the target site are captured to check the appearance of an object to be imaged in an image capturing environment.

In the example illustrated in FIG. 2, the robot 10 captures an image of the test object 6 installed at the target site and matches the obtained captured image against pre-stored reference images captured in different image capturing environments. The robot 10 specifies one of a plurality of image capturing patterns, based on the matching result, and sets the image capturing position and the image capturing direction of the robot 10 corresponding to the specified image capturing pattern. Then, the robot 10 captures images of the inspection target objects within the target site in the set image capturing position and image capturing direction.

Figure 3:
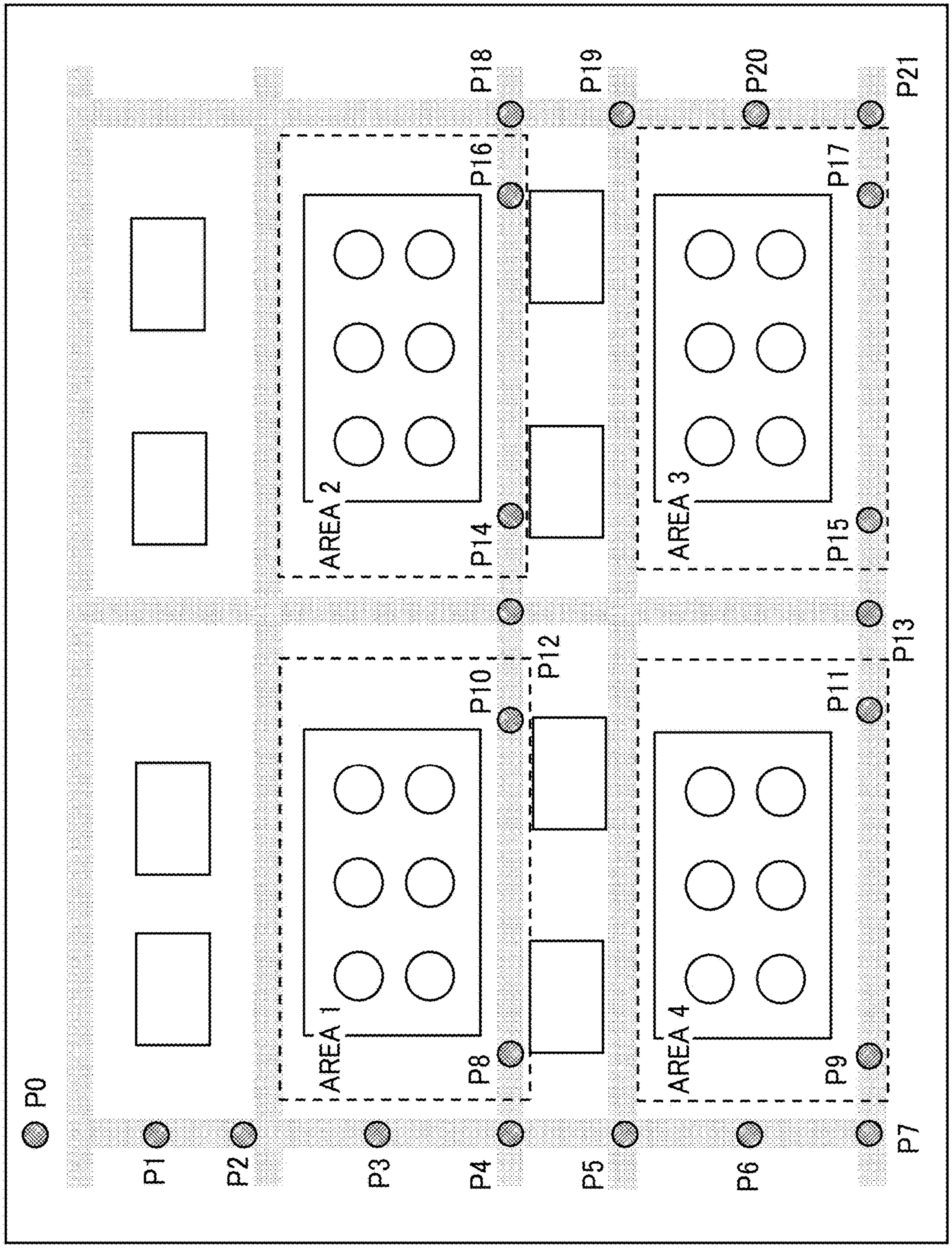
FIG. 3 is a view schematically illustrating an example of a moving route of the robot.

FIG. 3 is a view schematically illustrating an example of a moving route of the robot 10. The moving route of the robot 10 indicates a route to an intended movement destination along which desired site positions (P0, P1, P2, . . . ) at the target site as illustrated in FIG. 3 are sequentially designated. The desired site positions at the target site are each represented by XY coordinates indicating a coordinate position on map data representing the entire target site.

The target site illustrated in FIG. 3 is divided into four areas (areas 1 to 4) in units of inspection work. For example, to move the robot 10 to the area 1, a route whose destination is a site position P8, which is an area reference position of the area 1, is set (traveling through P0, P1, P2, P3, P4, and P8 in this order) as the moving route.

At a site such as a plant factory, leakage of liquid, gas, or the like from pipes may potentially cause a serious disaster, and thus, daily inspection or work by human workers involves the work of inspection for minute leakage from the pipes, meters such as a pressure gauge, opening or closing of valves, and so on. A large-scale plant factory may often have a site whose sides are each more than 1 km long, for example, and it takes a very large amount of time for inspection of all the inspection target objects such as pipes or meters within the site. Accordingly, a method using an inspection robot for inspection work is known. The inspection robot captures images of inspection target objects while traveling around the site either automatically or in response to an operation by a human worker.

Figure 4A:
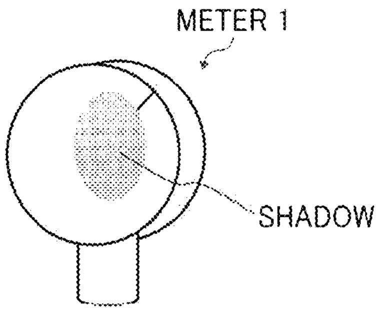
FIGS. 4A and 4B are views illustrating an example of states of an inspection target object from different image capturing positions.
Figure 4B:
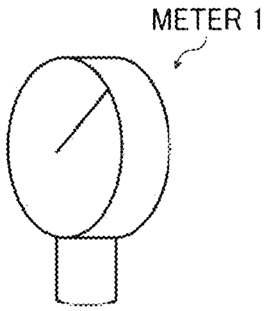

However, the existing inspection robot captures images of inspection target objects in an image capturing position and an image capturing direction that match set values set (taught) in advance by a human worker. In this case, for example, an inspection target object installed outdoors may be illuminated by sunlight in a manner that differs depending on environmental conditions such as weather and time of day, and an image with low readability may be captured depending on the reflection of light even in the same image capturing position and image capturing direction. For example, as illustrated in FIG. 4A, the meter 1, which is an inspection target object, may be obscured by shadow produced by reflected sunlight, which may hinder the reading of the meter to be inspected. However, as illustrated in FIG. 4B, the meter 1 is illuminated by sunlight in a manner that changes with the capturing angle, which makes the meter readable.

Accordingly, in the image capturing system 1, the test object 6 capable of detecting a change in the position of the sun or in sunlight condition such as brightness is installed in each inspection area of the target site, and an image of the test object 6 is captured by the robot 10, which is of a mobile type, before the inspection is started in the inspection area. In the image capturing system 1, furthermore, image capturing conditions indicating an image capturing position and an image capturing direction of an inspection target object set in the inspection area are set from an analysis result of a captured image of the test object 6. In the image capturing system 1, the robot 10 is moved to a set image capturing position to capture an image of the inspection target object in accordance with the set image capturing direction. As a result, in the image capturing system 1, an image of the inspection target object is captured by using image capturing conditions corresponding to an image capturing environment such as sunlight conditions that change with the inspection time of day or the weather, thereby ensuring that the state of the inspection target object can be read even in a case where it is difficult to read an image under image capturing conditions taught in advance.

The target site where the robot 10 is installed is not limited to the plant factory, and may be, for example, a business place, a construction site, a substation, or any other outdoor facility. For example, in a case where the inspection work at a site having a large site area is to be executed by human power, much time may be required to complete all the inspection work, or a plurality of human workers may be required to share the inspection work to complete all the inspection work. To address this, the robot 10 installed at the target site performs work, which is conventionally performed manually, on behalf of human workers, thereby improving the work efficiency. Note that the target site is not limited to an outdoor site and may be an indoor site such as an office, a school, a factory, a warehouse, a commercial facility, or another facility. The target site may be any site in which there are needs or wants to cause the robot 10 to perform work that is conventionally performed manually.

Configuration of Robot

Figure 5:
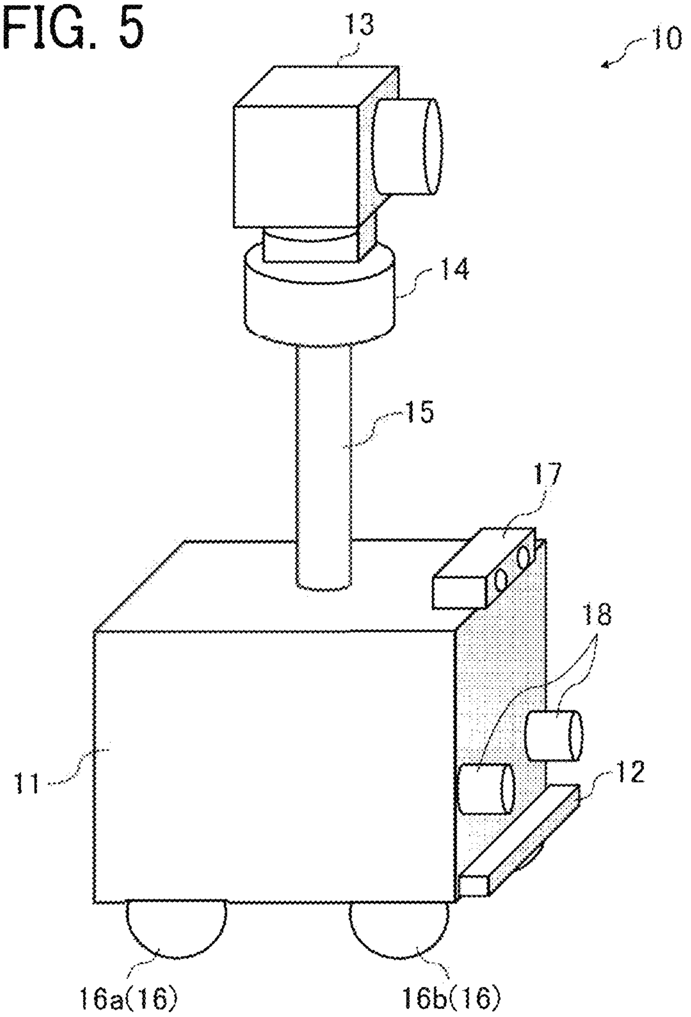
FIG. 5 is a view illustrating an example schematic configuration of the robot.
Figure 6:
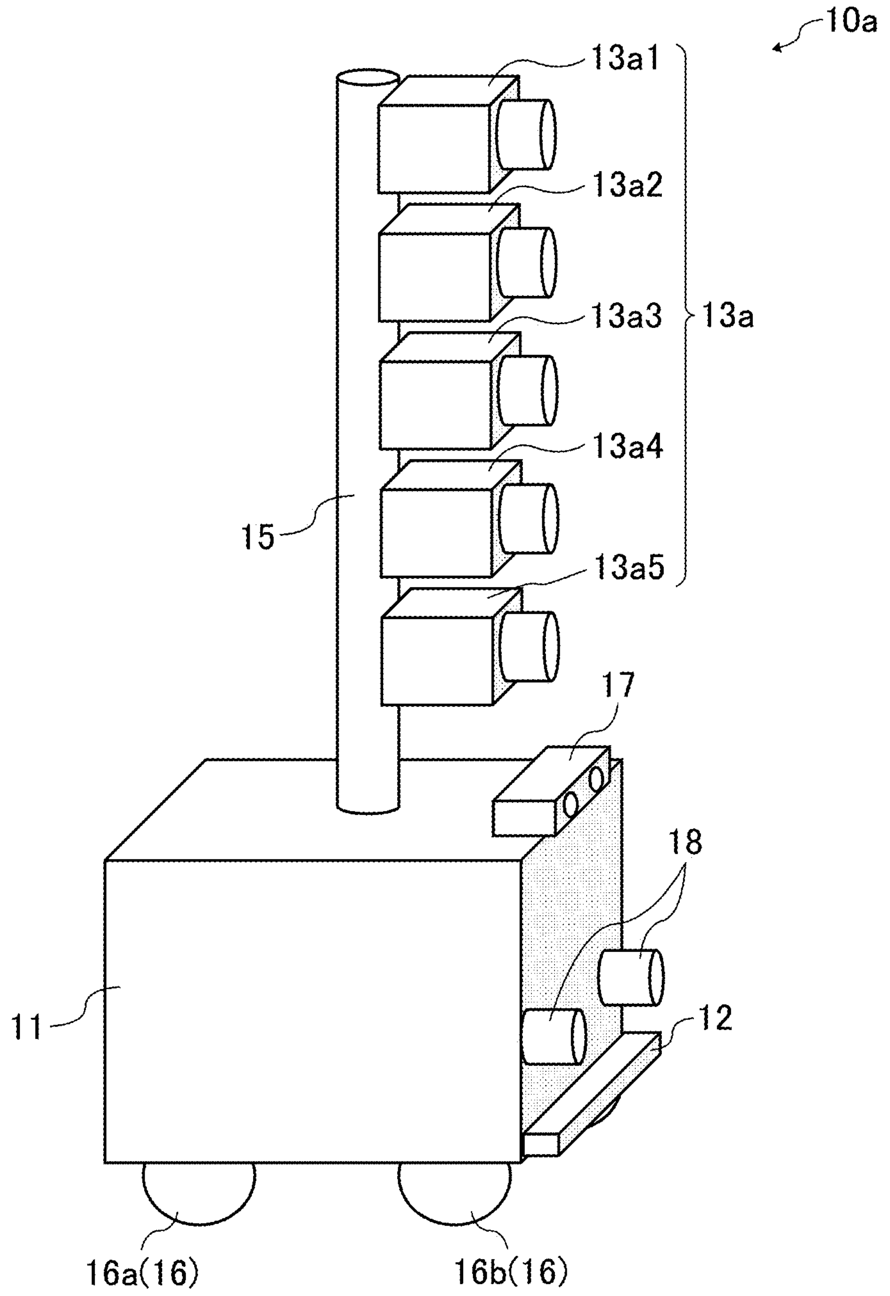
FIG. 6 is a view illustrating an example schematic configuration of the robot.
Figure 7:
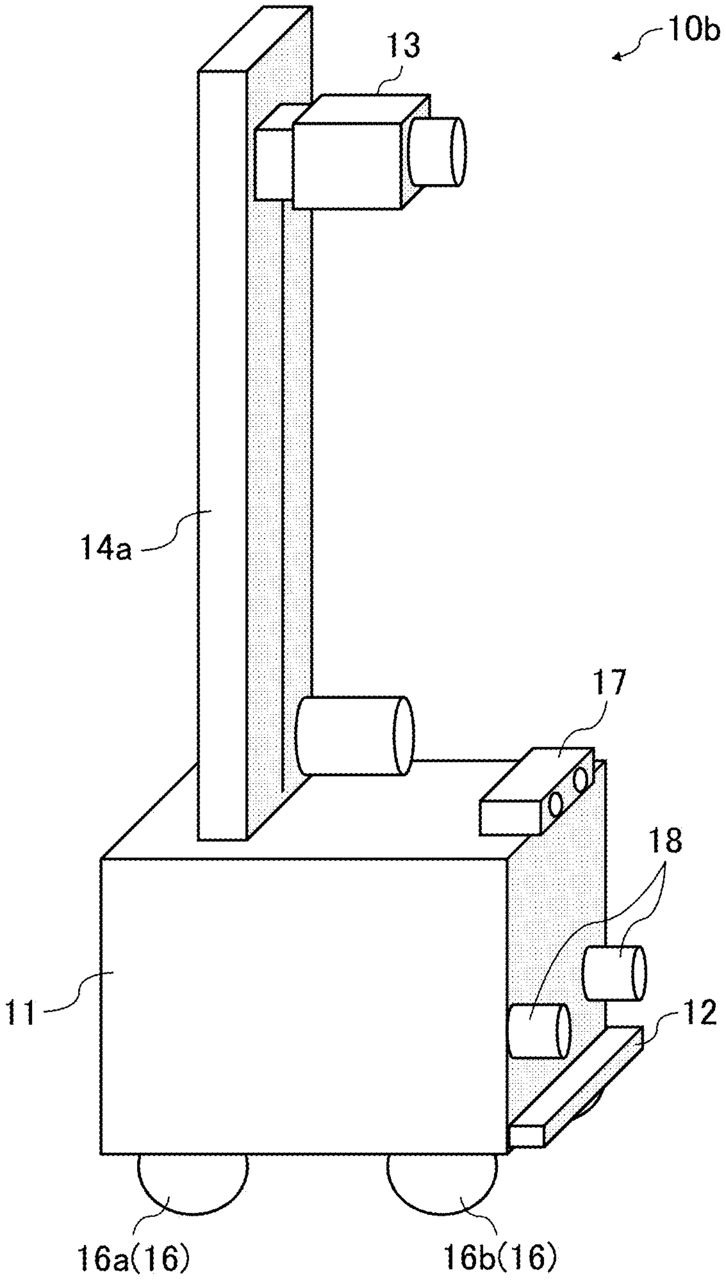
FIG. 7 is a view illustrating an example schematic configuration of the robot.

Next, the specific configuration of the robot 10 will be described with reference to FIGS. 5 to 7. FIGS. 5 to 7 are views illustrating example schematic configurations of the robot 10.

The robot 10 illustrated in FIG. 5 includes a housing 11, a bar 12, an image capturing device 13, an image-capturing-position adjustment device 14, a supporting member 15, a movement mechanism 16 (16*a* and 16*b*) for moving the robot 10, a GPS sensor 17, and obstacle detection sensors 18. The housing 11 has incorporated therein a control device 30 or the like. The control device 30 or the like is located in the torso of the robot 10 to control processing or operation of the robot 10. The control device 30 is an example of an information processing apparatus. The bar 12 is disposed on a front surface of the housing 11 in the traveling direction of the robot 10 and functions as a buffer in a collision of the robot 10. The bar 12 may be disposed not only on the front surface of the housing 11 but also on a side surface or a back surface of the housing 11.

The image capturing device 13 captures an image of a subject such as a person, an object, or a landscape in the site where the robot 10 is installed, and obtains a captured image.

The image capturing device 13 is a digital camera (general image capturing device) capable of acquiring a planar image (detailed image), such as a digital single-lens reflex camera or a compact digital camera. Captured image data related to the captured image acquired by the image capturing device 13 is transmitted to the communication terminal 70 via a communication session established by a server computer such as a communication management server.

The image-capturing-position adjustment device 14 is a movable device for adjusting an image capturing direction (orientation) of the image capturing device 13. The image-capturing-position adjustment device 14 is rotatably driven to adjust the image capturing direction of the image capturing device 13 and to adjust an amount of zoom (magnification) for capturing an image with the image capturing device 13. The image capturing device 13 and the image-capturing-position adjustment device 14 may be provided as a single device produced by providing the function of adjusting the image capturing position to the image capturing device 13.

The captured image acquired by the image capturing device 13 may be a moving image or a still image, or may include both a moving image and a still image. The captured image acquired by the image capturing device 13 may include audio data together with image data. Further, the image capturing device 13 may be a wide-angle image capturing device capable of acquiring a spherical (360-degree) panoramic image. The wide-angle image capturing device is, for example, a spherical image capturing device for capturing images of a subject to obtain two hemispherical images from which a spherical (panoramic) image is generated. The wide-angle image capturing device may be, for example, a wide-angle camera, a stereo camera, or the like capable of acquiring a wide-angle image having an angle of view equal to or greater than a predetermined value. That is, the wide-angle image capturing device is an image capturing means capable of acquiring an image (spherical image or wide-angle image) captured using a lens having a shorter focal length than a predetermined value. Alternatively, the robot 10 may include a plurality of image capturing devices 13. In this case, the robot 10 may include, as the image capturing devices 13, both a wide-angle image capturing device and a general image capturing device capable of capturing an image of part of a subject, which is captured by the wide-angle image capturing device, to acquire a detailed image (planar image).

Alternatively, the image capturing device 13 may include a thermal imaging device that performs far-infrared (infrared light) imaging or a special camera such as an infrared camera that captures a near-infrared (infrared light) image. The image capturing device 13, which is a thermal imaging device that performs far-infrared (infrared light) imaging, can acquire a captured image (thermographic image) in which far-infrared rays emitted from a target object are detected, and recognize the target object from the captured image. The image capturing device 13, which is an infrared camera that captures a near-infrared (infrared light) image, can acquire a captured image (infrared image) of a target object without being affected by disturbance light in the visible light wavelength band, and recognize the target object from the captured image.

The supporting member 15 is a member for installing (securing) the image capturing device 13 and the image-capturing-position adjustment device 14 to the robot 10 (the housing 11). The supporting member 15 may be a pole secured to the housing 11 or a base secured to the housing 11.

The movement mechanism 16 is a unit for moving the robot 10, and includes wheels, a traveling motor, a traveling encoder, a steering motor, a steering encoder, and so on. The movement control of the robot 10 is an existing technique and will not be described in detail herein. For example, the robot 10 receives a travel instruction from the administrator (the communication terminal 70), who is a human operator, and the movement mechanism 16 moves the robot 10 in accordance with the received travel instruction. The movement mechanism 16 may be of a bipedal type or a single-wheel type. In addition, the shape of the robot 10 is not limited to a vehicle type as illustrated in FIG. 4, and may be a bipedal humanoid shape, a shape mimicking a certain living thing, a shape mimicking a specific character, or any other shape.

The GPS sensor 17 is a self-position detection means for detecting the position of the robot 10 in response to receipt of a GPS signal from a GPS satellite. The obstacle detection sensors 18 are detection sensors that detect obstacles around the robot 10 during movement. The obstacle detection sensors 18 are each, for example, an image sensor such as a stereo camera or a camera provided with an area sensor on which photoelectric conversion elements are arranged in a planar manner, or a distance measurement sensor such as a time-of-flight (TOF) sensor, a light detection and ranging (LIDAR) sensor, or a radar sensor. The self-position detection means is not limited to the GPS sensor 17 and may be any technique capable of detecting the self-position by using any method. For example, the self-position detection means may use simultaneous localization and mapping (SLAM) using LIDAR or magnetic induction in an environment in which a magnetic tape or the like is laid on a travel path.

Modifications of the configuration of the robot 10 will be described with reference to FIGS. 6 and 7. A robot 10*a* illustrated in FIG. 6 includes a plurality of image capturing devices 13*a* (13*a*1, 13*a*2, 13*a*3, 13*a*4, and 13*a*5). The plurality of image capturing devices 13*a* are attached to the supporting member 15 in such a manner as to be arranged in the vertical direction of the supporting member 15. A robot 10*b* illustrated in FIG. 7 includes a slide device 14*a* capable of sliding the image capturing device 13 in the vertical direction. The robot 10*b* can adjust the image capturing position (height) by making the image capturing device 13 movable in the vertical direction along the slide device 14*a*.

As described above, the robot 10 provided with the plurality of image capturing devices 13*a*, like the robot 10*a*, or provided with the slide device 14*a* capable of sliding the image capturing device 13 in the vertical direction, like the robot 10*b*, can also adjust the image capturing position of the image capturing device 13 (13*a*).

In addition to the configuration described above, the robot 10 may include various sensors capable of detecting information on the surroundings of the robot 10. The various sensors are sensor devices, examples of which include as a barometer, a thermometer, a photometer, a motion sensor, a gas sensor, an odor sensor, and an illuminometer. The robot 10 may further include a movable arm that performs an additional operation other than movement.

Hardware Configuration

Next, the hardware configuration of the devices or terminals of the schedule registration system according to the embodiment will be described with reference to FIGS. 8 and 9. An element may be added to or deleted from the hardware configuration of the device or terminal illustrated in FIGS. 8 and 9.

Hardware Configuration of Robot

Figure 8:
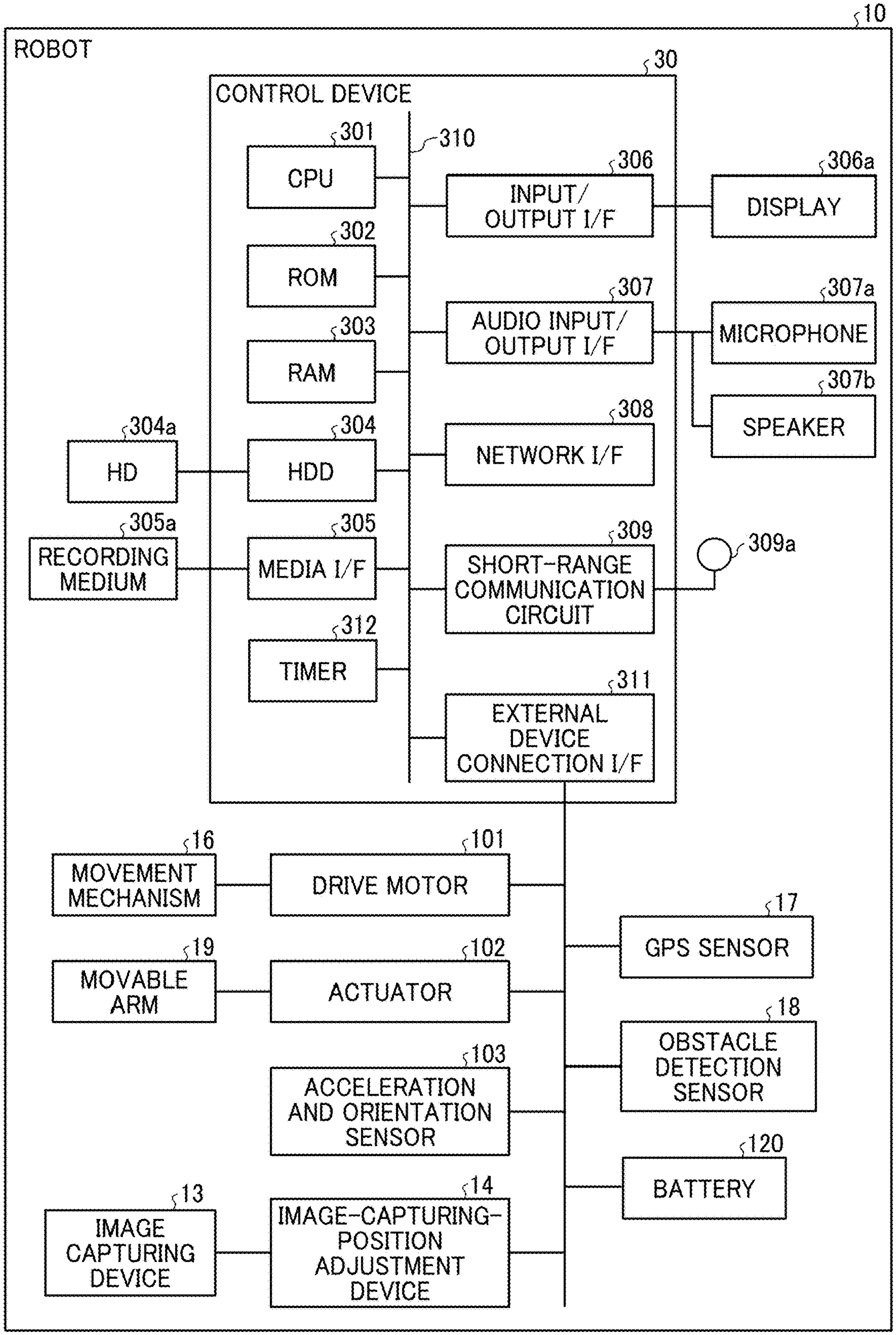
FIG. 8 is a diagram illustrating an example hardware configuration of the robot.

FIG. 8 is a diagram illustrating an example hardware configuration of the robot. The robot 10 includes the control device 30 that controls processing or operation of the robot 10. As described above, the control device 30 is provided inside the housing 11 of the robot 10. The control device 30 may be disposed outside the housing 11 of the robot 10 or may be disposed as a device separate from the robot 10.

The control device 30 includes a central processing unit (CPU) 301, a read only memory (ROM) 302, a random access memory (RAM) 303, a hard disk drive (HDD) 304, a media interface (I/F) 305, an input/output I/F 306, an audio input/output I/F 307, a network I/F 308, a short-range communication circuit 309, an antenna 309*a* of the short-range communication circuit 309, an external device connection I/F 311, a timer 312, and a bus line 310.

The CPU 301 performs overall control of the robot 10. The CPU 301 is an arithmetic device that reads programs and data stored in the ROM 302, a hard disk (HD) 304*a*, or the like to the RAM 303 and executes processing to implement functions of the robot 10.

The ROM 302 is a nonvolatile memory that keeps a program or data even if the power is turned off. The RAM 303 is a volatile memory used as a work area or the like for the CPU 301. The HDD 304 controls reading or writing of various types of data from or to the HD 304*a* under control of the CPU 301. The HD 304*a* stores various types of data such as programs. The media I/F 305 controls reading or writing (storing) of data from or to a recording medium 305*a* such as a universal serial bus (USB) memory, a memory card, an optical disc, or a flash memory.

The input/output I/F 306 is an interface for inputting and outputting characters, numerical values, various instructions, and the like to and from various external devices. The input/output I/F 306 controls display of various types of information such as a cursor, a menu, a window, text, or an image on a display 306*a* such as a liquid crystal display (LCD). The display 306*a* may be a touch panel display provided with input means. The input/output I/F 306 may be connected to input means such as a mouse and a keyboard in addition to the display 306*a*. The audio input/output I/F 307 is a circuit that processes input and output of sound signals between a microphone 307*a* and a speaker 307*b* under control of the CPU 301. The microphone 307*a* is an example of built-in sound collecting means for inputting a sound signal under control of the CPU 301. The speaker 307*b* is an example of reproducing means for outputting a sound signal under control of the CPU 301.

The network I/F 308 is a communication interface that enables communication (connection) with other devices or apparatuses via the communication network 100. The network I/F 308 is, for example, a communication interface such as a wired or wireless LAN. The short-range communication circuit 309 is a communication circuit such as a near field communication (NFC) or Bluetooth® communication circuit. The external device connection I/F 311 is an interface for connecting the control device 30 to another device. The timer 312 is a measurement device having a time measurement function. The timer 312 may be a computer-based software timer.

The bus line 310 is an address bus, a data bus, or the like for electrically connecting the elements described above and transmits an address signal, a data signal, and various control signals. The CPU 301, the ROM 302, the RAM 303, the HDD 304, the media I/F 305, the input/output I/F 306, the audio input/output I/F 307, the network I/F 308, the short-range communication circuit 309, the external device connection I/F 311, and the timer 312 are connected to each other via the bus line 310.

The control device 30 is further connected, via the external device connection I/F 311, to a drive motor 101, an actuator 102, an acceleration and orientation sensor 103, the image-capturing-position adjustment device 14, the Global Positioning System (GPS) sensor 17, the obstacle detection sensors 18, and a battery 120.

The drive motor 101 rotatably drives the movement mechanism 16 to cause the robot 10 to move along the ground in accordance with an instruction from the CPU 301. The actuator 102 moves a movable arm 19 in accordance with an instruction from the CPU 301. The movable arm 19 has a moving means that enables additional operation other than the movement of the robot 10. The movable arm 19 includes, as an operation means, a hand for grasping an object such as a component, at the distal end of the movable arm 19, for example. The robot 10 rotates or moves the movable arm 19, thereby being able to perform predetermined work (operation). Examples of the acceleration and orientation sensor 103 include sensors such as an electromagnetic compass for detecting geomagnetism, a gyrocompass, and an acceleration sensor. The battery 120 is a unit that supplies power required for the entire robot 10.

Hardware Configuration of Image Management Server

Figure 9:
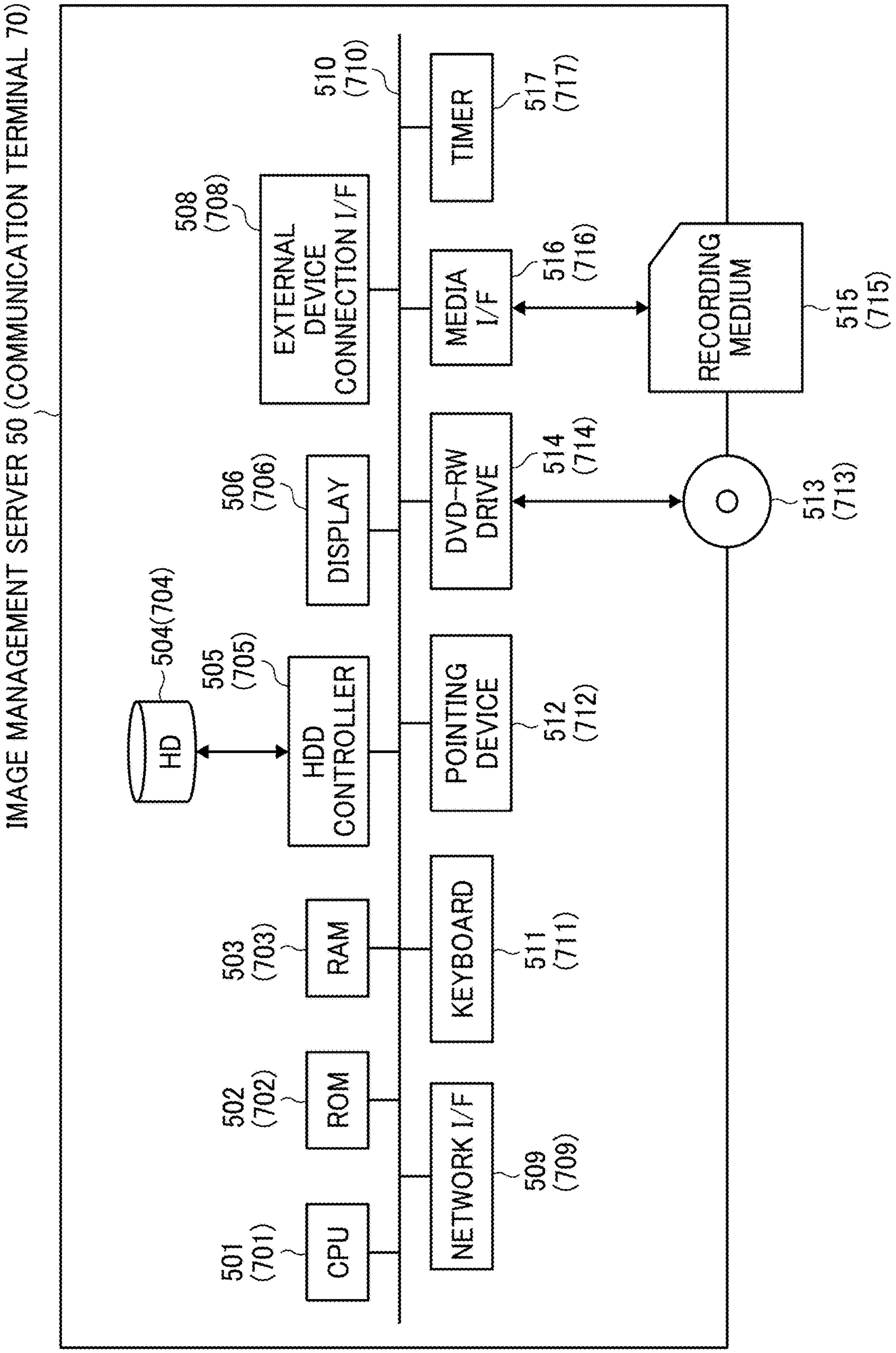
FIG. 9 is a diagram illustrating an example hardware configuration of an image management server and a communication terminal.

FIG. 9 is a diagram illustrating an example hardware configuration of the image management server 50. The hardware elements of the image management server 50 are denoted by reference numerals in 500 series. The image management server 50 is implemented by a computer. As illustrated in FIG. 9, the image management server 50 includes a CPU 501, a ROM 502, a RAM 503, an HD 504, an HDD controller 505, a display 506, an external device connection I/F 508, a network I/F 509, a bus line 510, a keyboard 511, a pointing device 512, a digital versatile disk rewritable (DVD-RW) drive 514, a media I/F 516, and a timer 517.

The CPU 501 controls the overall operation of the image management server 50. The ROM 502 stores programs such as an initial program loader (IPL) used to drive the CPU 501. The RAM 503 is used as a work area for the CPU 501. The HD 504 stores various types of data such as programs. The HDD controller 505 controls reading or writing of various types of data from or to the HD 504 under control of the CPU 501. The display 506 displays various types of information such as a cursor, a menu, a window, text, or an image. The display 506 may be a touch panel display provided with input means. The external device connection I/F 508 is an interface for connecting to various external devices. Examples of the external devices include a USB memory and a printer. The network I/F 509 is an interface for performing data communication using the communication network 100. The bus line 510 is an address bus, a data bus, or the like for electrically connecting the elements illustrated in FIG. 9, such as the CPU 501, to each other.

The keyboard 511 is an example of input means including a plurality of keys for inputting characters, numerical values, various instructions, and the like. The pointing device 512 is an example of input means for selecting or executing various instructions, selecting a target for processing, or moving a cursor being displayed. The input means are not limited to the keyboard 511 and the pointing device 512, and may be a touch panel, a voice input device, or the like. The DVD-RW drive 514 controls reading or writing of various types of data from or to a DVD-RW 513, which is an example of a removable recording medium. The removable recording medium is not limited to the DVD-RW, and may be a DVD-R, Blu-ray® Disc, or the like. The media I/F 516 controls reading or writing (storing) of data from or to a recording medium 515 such as a flash memory. The timer 517 is a measurement device having a time measurement function. The timer 517 may be a computer-based software timer.

Hardware Configuration of Communication Terminal

FIG. 9 is a diagram illustrating an example hardware configuration of the communication terminal 70. The hardware elements of the communication terminal 70 are denoted by reference numerals in 700 series in parentheses. The communication terminal 70 is implemented by a computer. As illustrated in FIG. 9, the communication terminal 70 has a configuration similar to that of the image management server 50, and thus the description of the hardware elements thereof will be omitted. The display 706 is an example of a display unit. The display unit serving as the display 706 may be an external device connected to the communication terminal 70 and having a display function. The display unit in this case may be, for example, an external display such as an interactive white board (IWB) or a projection target unit (for example, a ceiling or a wall at the management site) onto which an image from a projector (PJ) connected as an external device is projected.

The programs described above may be each recorded in a file in an installable or executable format on a computer-readable recording medium for distribution. Examples of the recording medium include a compact disc recordable (CD-R), a digital versatile disk (DVD), a Blu-ray Disc, an SD card, and a USB memory. In addition, such recording media may be provided in the domestic or global markets as program products. For example, the control device 30 executes a program according to the present invention to implement the image capturing control method according to the present invention.

Functional Configuration

Figure 10:
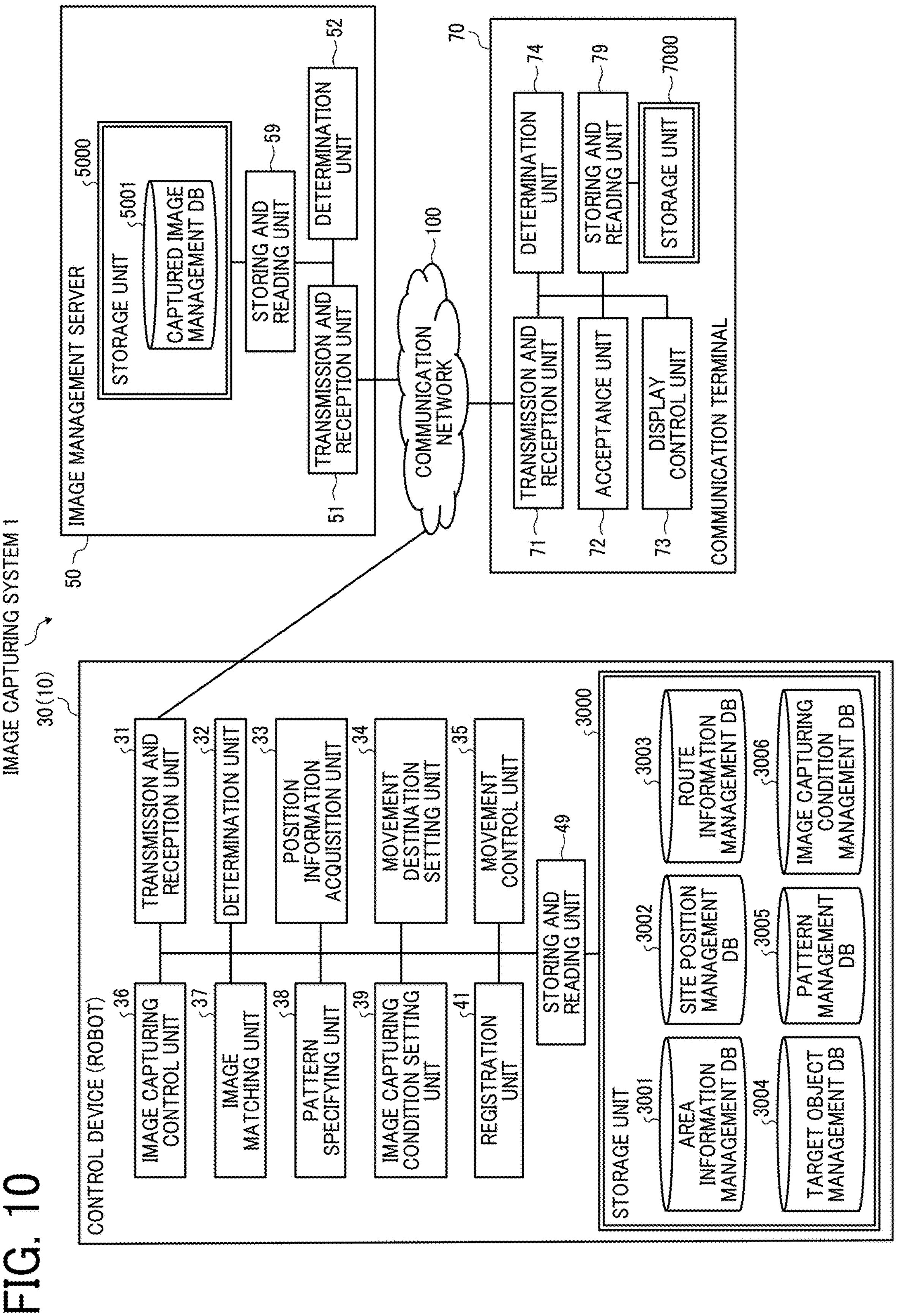
FIG. 10 is a diagram illustrating an example functional configuration of the image capturing system.

Next, the functional configuration of the image capturing system 1 according to the embodiment will be described with reference to FIGS. 10 to 17. FIG. 10 is a diagram illustrating an example functional configuration of the image capturing system 1. FIG. 10 illustrates components related to processing or operation described below among the components of the device and terminal illustrated in FIG. 1.

Functional Configuration of Robot (Control Device)

First, the functional configuration of the control device 30, which controls processing or operation of the robot 10, will be described with reference to FIG. 10. The control device 30 includes a transmission and reception unit 31, a determination unit 32, a position information acquisition unit 33, a movement destination setting unit 34, a movement control unit 35, an image capturing control unit 36, an image matching unit 37, a pattern specifying unit 38, an image capturing condition setting unit 39, a registration unit 41, and a storing and reading unit 49. These units are functions implemented by or means caused to function by operating any of the elements illustrated in FIG. 8 in response to an instruction from the CPU 301 according to a control device program loaded onto the RAM 303. The control device 30 further includes a storage unit 3000 implemented by the ROM 302, the HD 304*a*, or the recording medium 305*a* illustrated in FIG. 8.

The transmission and reception unit 31 is implemented mainly by processing on the network I/F 308 by the CPU 301, and transmits or receives various types of data or information to or from another device or terminal via the communication network 100.

The determination unit 32 is implemented by processing by the CPU 301, and performs various determinations. The position information acquisition unit 33 is implemented mainly by processing on the external device connection I/F 311 by the CPU 301, and acquires position information indicating the current position of the robot 10 detected by the GPS sensor 17.

The movement destination setting unit 34 is implemented mainly by processing by the CPU 301, and sets a movement destination of the robot 10. For example, the movement destination setting unit 34 sets, as the movement destination of the robot 10, a moving route for moving to a target area for which a process start request transmitted from the communication terminal is intended. The movement control unit 35 is implemented mainly by processing on the external device connection I/F 311 by the CPU 301, and drives the movement mechanism 16 to control the movement of the robot 10. For example, the movement control unit 35 moves the robot 10 to a movement destination set by the movement destination setting unit 34.

The image capturing control unit 36 is implemented mainly by processing on the external device connection I/F 311 by the CPU 301, and controls an image capturing process for the image capturing device 13. For example, the image capturing control unit 36 instructs the image capturing device 13 to perform an image capturing process. Further, the image capturing control unit 36 acquires, for example, a captured image obtained by the image capturing process performed by the image capturing device 13.

The image matching unit 37 is implemented mainly by processing by the CPU 301, and performs an image matching process between reference images stored in a pattern management DB 3005 (see FIG. 15) described below and a captured image of the test object 6 acquired by the image capturing control unit 36. The reference images are images showing different appearances of the test object 6, which is an object to be imaged. The reference images are images of the test object 6 captured in past inspection work. The reference images are images showing different appearances of the test object 6 in image capturing environments that differ depending on sunlight conditions such as the image capturing time of day or the weather.

The pattern specifying unit 38 is implemented mainly by processing by the CPU 301, and specifies an image capturing pattern of the inspection target object, based on the matching result obtained by the image matching unit 37. The image capturing pattern is a pattern for setting different image capturing conditions depending on a difference in the appearance of the inspection target object. The image capturing condition setting unit 39 is implemented mainly by processing on the image-capturing-position adjustment device 14 by the CPU 301, and sets image capturing conditions for the image capturing control unit 36 in accordance with the image capturing pattern specified by the pattern specifying unit 38. The registration unit 41 is implemented mainly by processing by the CPU 301, and registers image capturing conditions for an inspection target object corresponding to an image capturing pattern.

The storing and reading unit 49 is implemented mainly by processing by the CPU 301, and stores various types of data (or information) in the storage unit 3000 or reads various types of data (or information) from the storage unit 3000.

Area Information Management Table

FIG. 11 is a conceptual diagram illustrating an example of an area information management table. The area information management table is a table for managing area information indicating areas of the target site that is divided by inspection work. The storage unit 3000 includes an area information management DB 3001 implemented by an area information management table as illustrated in FIG. 11.

The area information management table manages area information in which an area ID and an area name for identifying a predetermined area within the target site and a reference position for specifying the position of the area are associated with each other. The reference position is position information used by the robot 10 to specify an area within the target site. The reference position is specified by, for example, two site positions along the travel route of the robot 10.

Site Position Management Table

FIG. 12 is a conceptual diagram illustrating an example of a site position management table. The site position management table is a table for managing site position information indicating a specific site position within the target site. The storage unit 3000 includes a site position management DB 3002 implemented by a site position management table as illustrated in FIG. 12.

The site position management table manages site position information in which a site position ID for identifying a predetermined position within the target site and position information indicating an intended site position are associated with each other. The site position management table stores a plurality of positions along the travel route of the robot 10 within the target site at predetermined intervals. The position information of the intended site position is represented by XY coordinates indicating a coordinate position on map data representing the entire target site. The robot 10 moves to an intended movement destination in accordance with the moving route set by using the position information indicated in the site position information.

Route Information Management Table

FIG. 13 is a conceptual diagram illustrating an example of a route information management table. The route information management table is a table for managing route information indicating a moving route along which the robot 10 moves within the target site. The storage unit 3000 includes a route information management DB 3003 implemented by a route information management table as illustrated in FIG. 13.

The route information management table manages route information in which a route ID for identifying a moving route of the robot 10, an area ID for identifying an area serving as a movement destination using a target moving route, and route data indicating the content of a specific moving route are associated with each other. The route data indicates a moving route of the robot 10, whose destination is the target area, as an order of site position IDs of site positions arranged at predetermined intervals.

Target Object Management Table

FIG. 14 is a conceptual diagram illustrating an example of a target object management table. The target object management table is a table for managing information on inspection target objects within the target site. The storage unit 3000 includes a target object management DB 3004 implemented by a target object management table as illustrated in FIG. 14.

The target object management table manages, for each area ID for identifying an inspection area within the target site, a target object ID and a target object name for identifying an inspection target object located in the target object area in association with each other. When the inspection target object is the test object 6 (target object ID "S1"), the target object management table further manages position information indicating the image capturing position of the test object 6 in association with the target object ID and the target object name indicating the test object 6.

Pattern Management Table

FIG. 15 is a conceptual diagram illustrating an example of a pattern management table. The pattern management table is a table for managing an image capturing pattern of an inspection target object determined in accordance with a captured image of the test object 6. The storage unit 3000 includes a pattern management DB 3005 implemented by a pattern management table as illustrated in FIG. 15.

The pattern management table manages a pattern ID and a pattern name for identifying an image capturing pattern, and reference image data corresponding to the image capturing pattern of interest in association with each other. Each time an image of the test object 6 is captured in the inspection work, the robot 10 stores, as appropriate, the captured image of the test object 6 as reference image data as an image capturing pattern corresponding to the image capturing environment at the time of capturing the image.

Image Capturing Condition Management Table

FIG. 16 is a conceptual diagram illustrating an example of an image capturing condition management table. The image capturing condition management table is a table for managing image capturing conditions for an inspection target object for each image capturing pattern. The storage unit 3000 includes an image capturing condition management DB 3006 implemented by an image capturing condition management table as illustrated in FIG. 16.

The image capturing condition management table manages, for each area ID for identifying a predetermined area within the target site, a pattern ID for identifying a pattern, a target object ID for identifying an inspection target object to be imaged, and image capturing condition information indicating image capturing conditions for the inspection target object, in association with each other. The image capturing condition information includes image capturing position information indicating the image capturing position of the inspection target object and image capturing direction information indicating the image capturing direction of the image capturing device 13.

The image capturing position information indicates a stop position of the robot 10 to capture an image of an inspection target object. The image capturing position information includes image capturing point information indicating a site position at which the robot 10 makes a stop or reference position distance information indicating a site from an area reference position of the target area. Like the site position information, the image capturing point information is represented by XY coordinates indicating a coordinate position on map data representing the entire target site. By contrast, the reference position distance information is represented by a distance from the area reference position on the travel route of the robot 10. It is desirable that the image capturing position information include any one of the image capturing point information and the reference position distance information. The image capturing condition information may include not only the image capturing position information and the image capturing direction information but also information on a parameter at the image capturing time, such as the aperture (F value), the shutter speed, the ISO sensitivity, or the presence or absence of a flash of the image capturing device 13. The image capturing condition information may further include image capturing parameters specific to the type of the image capturing device 13, such as the special camera described above.

The image capturing direction information includes PTZ (pan, tilt, and zoom) parameters for specifying the image capturing direction of the image capturing device 13. For example, the image capturing condition setting unit 39 controls the image-capturing-position adjustment device 14 in accordance with the parameters indicated in the image capturing direction information to set image capturing conditions for the image capturing device 13. The image capturing control unit 36 captures an image of the inspection target object in accordance with the image capturing conditions set by the image capturing condition setting unit 39.

Functional Configuration of Image Management Server

Next, the functional configuration of the image management server 50 will be described with reference to FIG. 10. The image management server 50 includes a transmission and reception unit 51, a determination unit 52, and a storing and reading unit 59. These units are functions implemented by or means caused to function by operating any of the elements illustrated in FIG. 9 in response to an instruction from the CPU 501 according to an image management server program loaded onto the RAM 503. The image management server 50 further includes a storage unit 5000 implemented by the ROM 502, the HD 504, or the recording medium 515 illustrated in FIG. 9.

The transmission and reception unit 51 is implemented mainly by processing on the network I/F 509 by the CPU 501, and transmits or receives various types of data or information to or from another device or terminal. The determination unit 52 is implemented by processing by the CPU 501, and performs various determinations.

The storing and reading unit 59 is implemented mainly by processing by the CPU 501, and stores various types of data (or information) in the storage unit 5000 or reads various types of data (or information) from the storage unit 5000.

Captured Image Management Table

FIG. 17 is a conceptual diagram illustrating an example of a captured image management table. The captured image management table is a table for managing images of inspection target objects captured by the robot 10. The storage unit 5000 includes a captured image management DB 5001 implemented by an image management table as illustrated in FIG. 17.

The captured image management table manages, for each area ID for identifying an inspection area within the target site, a target object ID and a target object name for identifying an inspection target object, and captured image data of the inspection target object of interest, in association with each other.

Functional Configuration of Communication Terminal

Next, the functional configuration of the communication terminal 70 will be described with reference to FIG. 10. The communication terminal 70 includes a transmission and reception unit 71, an acceptance unit 72, a display control unit 73, a determination unit 74, and a storing and reading unit 79. These units are functions implemented by or means caused to function by operating any of the elements illustrated in FIG. 9 in response to an instruction from the CPU 701 according to a communication terminal program loaded onto the RAM 703. The communication terminal 70 further includes a storage unit 7000 implemented by the ROM 702, the HD 704, or the recording medium 715 illustrated in FIG. 9.

The transmission and reception unit 71 is implemented mainly by processing on the network I/F 709 by the CPU 701, and transmits or receives various types of data or information to or from another device or terminal via the communication network 100.

The acceptance unit 72 is implemented mainly by processing on the keyboard 711 or the pointing device 712 by the CPU 701, and receives various selections or inputs from the user. The display control unit 73 is implemented mainly by processing by the CPU 701, and causes a display unit such as the display 706 to display various screens. The determination unit 74 is implemented by processing by the CPU 701, and performs various determinations.

The storing and reading unit 79 is implemented mainly by processing by the CPU 701, and stores various types of data (or information) in the storage unit 7000 or reads various types of data (or information) from the storage unit 7000.

Processing or Operation According to Embodiment

Target Object Image Capturing Process

Figure 18:
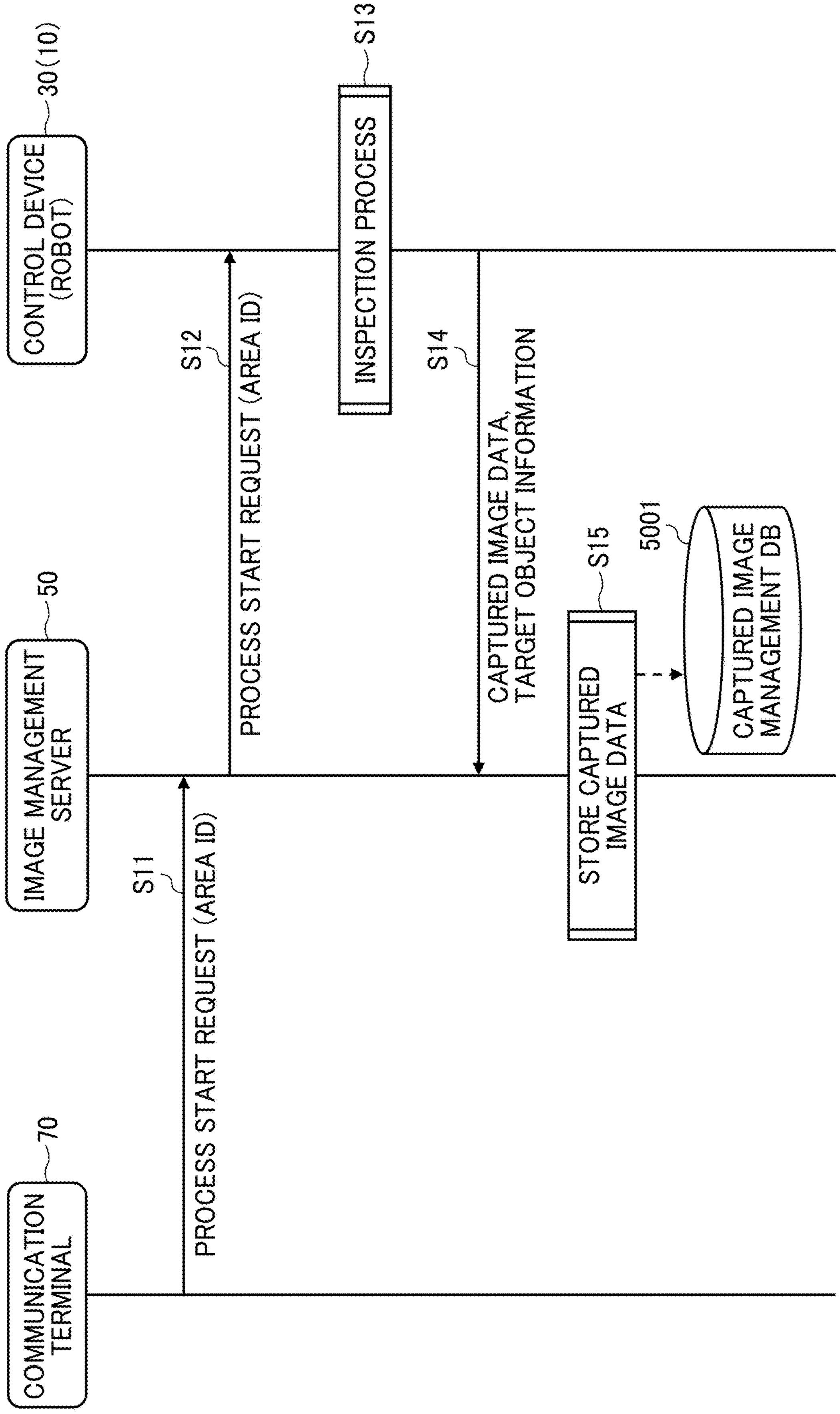
FIG. 18 is a sequence diagram illustrating an example of a target object inspection process.

Next, processing or operation of the image capturing system 1 according to an embodiment will be described with reference to FIGS. 18 to 36. First, a process for capturing an image of an inspection target object within the target object area by using the robot 10 will be described with reference to FIGS. 18 to 25. FIG. 18 is a sequence diagram illustrating an example of a target object inspection process.

First, in response to an administrator A located at the management site performing an input operation or the like on the input means of the communication terminal 70, the transmission and reception unit 71 of the communication terminal 70 transmits, to the image management server 50, a process start request indicating a request made to the robot 10 to start inspection work (step S11). The process start request includes an area ID for identifying the target area in which the requested inspection work is to be performed. Thus, the transmission and reception unit 51 of the image management server 50 receives the process start request transmitted from the communication terminal 70.

Figure 19:
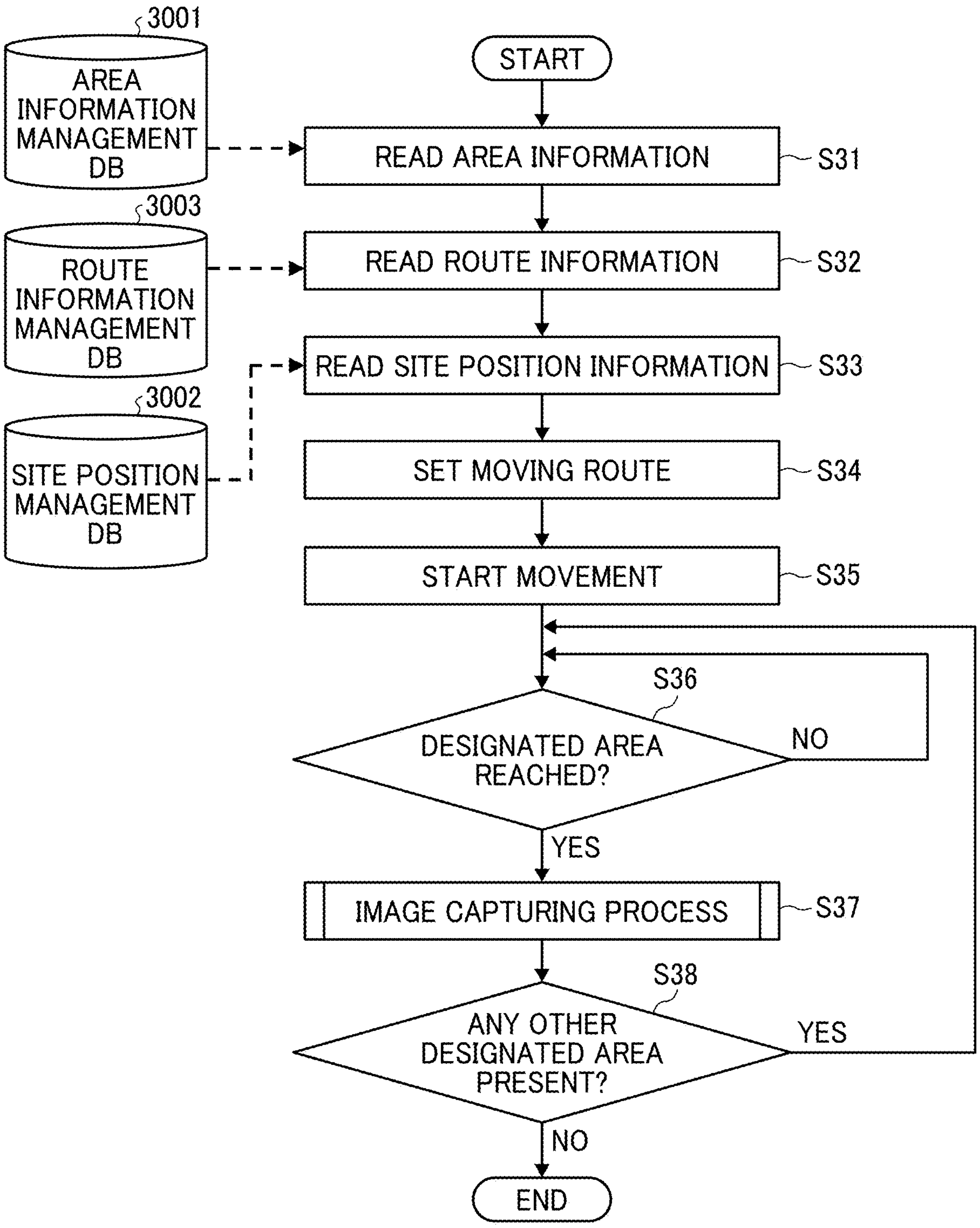
FIG. 19 is a flowchart illustrating an example of a target object inspection process performed by the robot.

Subsequently, the transmission and reception unit 51 of the image management server 50 transmits (transfers), to the robot 10, the process start request transmitted from the communication terminal 70 (step S12). Thus, the transmission and reception unit 31 of the control device 30 included in the robot 10 receives the process start request transmitted (transferred) from the image management server 50. Subsequently, the robot 10 starts an inspection process on an inspection target object in accordance with the received process start request (step S13). The inspection process performed by the robot 10 on the inspection target object will now be described in detail with reference to FIGS. 19 to 25. FIG. 19 is a flowchart illustrating an example of a target object inspection process performed by the robot 10.

First, the storing and reading unit 49 searches the area information management DB 3001 (see FIG. 11) by using the area ID received in step S12 as a search key to read area information associated with the same area ID as the received area ID (step S31). Further, the storing and reading unit 49 searches the route information management DB 3003 (see FIG. 13) by using the area ID received in step S12 as a search key to read route information associated with the same area ID as the received area ID (step S32). Further, the storing and reading unit 49 reads the site position information stored in the site position management DB 3002 (see FIG. 12) (step S33).

Subsequently, the movement destination setting unit 34 sets a movement destination of the robot 10, based on the route information read in step S32 (step S34). Specifically, the movement destination setting unit 34 uses position information indicating the current position of the robot 10, which is acquired by the position information acquisition unit 33, and route data indicated in the read route information to set a moving route along which the robot 10 is to move to the movement destination, in the order of the site positions indicated by the route data. For example, to move the robot 10 to the area 1, the movement destination setting unit 34 sets a moving route (traveling through P0, P1, P2, P3, P4, and P8 in this order) whose destination is the site position P8, which is an area reference position of the area 1.

Subsequently, the movement control unit 35 moves the robot 10 along the moving route set by the movement destination setting unit 34 (step S35). Specifically, the movement control unit 35 moves the robot 10 such that the robot 10 passes through the site positions indicated in the set moving route in sequence. If the robot 10 has reached the designated area (YES in step S36), the determination unit 32 causes the process to proceed to step S36. Specifically, if the current position of the robot 10, which is indicated by the position information acquired by the position information acquisition unit 33, matches or comes close to the area reference position indicated in the area information read in step S31, the determination unit 32 determines that the robot 10 has reached the designated area. On the other hand, the control device 30 causes the movement control unit 35 to move the robot 10 until the robot 10 reaches the designated area (NO in step S36).

Subsequently, the control device 30 executes a process of capturing images of inspection target objects within the designated area (step S37). If the determination unit 32 determines that any other designated area is present, based on the area ID received in step S11 (YES in step S38), the control device 30 repeats the process from step S36 and repeats the movement to the other designated area and the image capturing process. On the other hand, if the determination unit 32 determines that no other designated area is present (NO in step S38), the control device 30 ends the inspection process for the inspection target objects.

Figure 20:
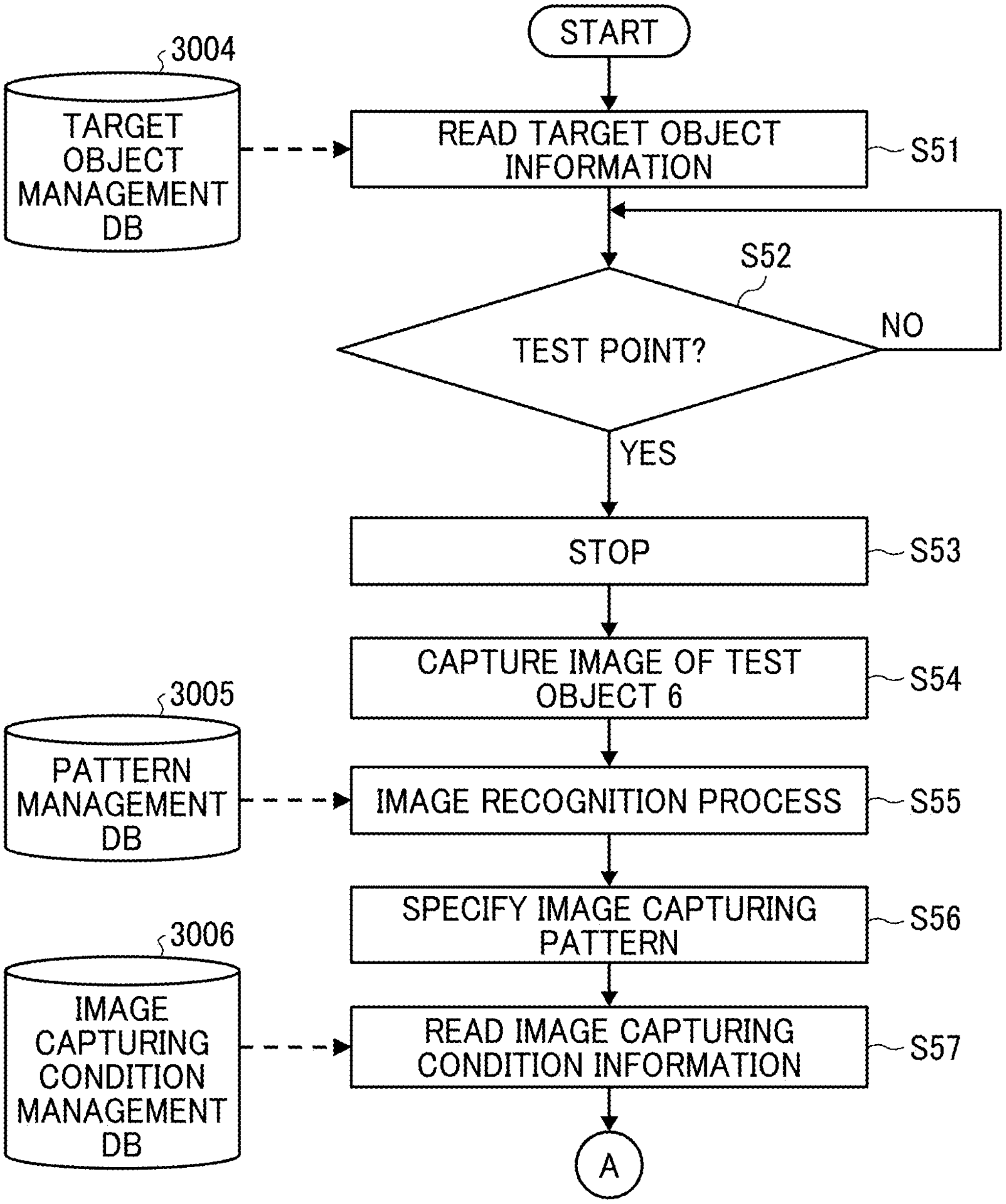
FIG. 20 is a flowchart illustrating an example of a target object image capturing process.
Figure 21:
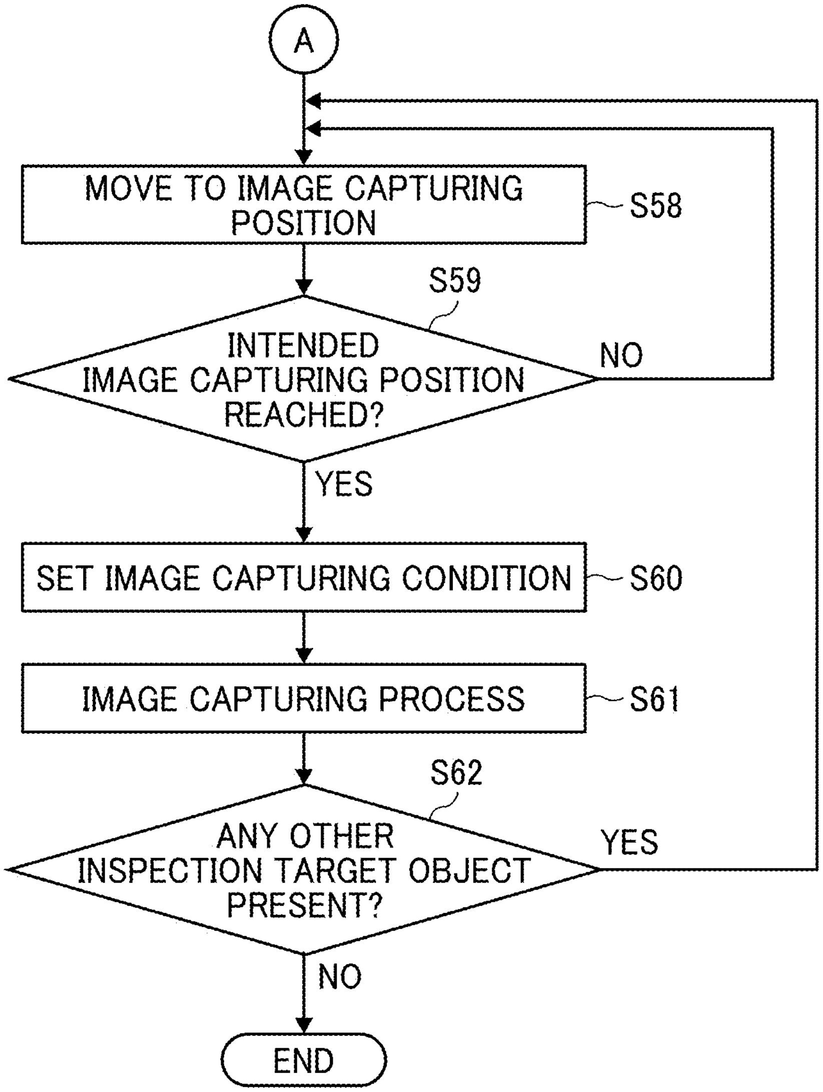
FIG. 21 is a flowchart illustrating the example of the target object image capturing process.

The process of capturing images of the inspection target objects in step S37 will now be described in detail with reference to FIGS. 20 to 25. FIG. 20 and FIG. 21 are a flowchart illustrating an example of a target object image capturing process. It is assumed that, after reaching the designated area in step S36, the robot 10 continuously moves along the moving route set by the movement destination setting unit 34.

First, the storing and reading unit 49 searches the target object management DB 3004 (see FIG. 14) by using the area ID of the designated area determined to have been reached in step S35 as a search key to read target object information associated with the same area ID as the area ID of interest (step S51).

If the determination unit 32 determines that the robot 10 has reached a test point (YES in step S52), the process proceeds to step S53. The test point is an image capturing position of the test object 6. Specifically, if the current position of the robot 10, which is indicated by the position information acquired by the position information acquisition unit 33, matches or comes close to the test point indicated by the target object information read in step S51, the determination unit 32 determines that the robot 10 has reached the test point. On the other hand, the control device 30 causes the movement control unit 35 to move the robot 10 until the robot 10 reaches the test point (NO in step S52).

If the robot 10 has reached the test point, the movement control unit 35 brings the robot 10 to a stop (step S53). Subsequently, the image capturing control unit 36 performs an image capturing process on the test object 6 and acquires a captured image of the test object 6 (step S54).

Subsequently, the image matching unit 37 performs an image matching process between the reference image data stored in the pattern management DB 3005 (see FIG. 15) and the captured image of the test object 6 acquired in step S54 (step S55). Specifically, for example, the image matching unit 37 calculates parameters such as the degrees of coincidence or similarity between a plurality of stored items of reference image data and the acquired captured image, and determines a reference image having the highest calculated parameter among the plurality of items of reference image data. That is, the image matching unit 37 uses the captured image of the test object 6 to determine a reference image having the closest appearance of the test object 6 under sunlight conditions or the like at the time of capturing the image.

Subsequently, the pattern specifying unit 38 specifies the image capturing pattern associated with the reference image determined in step S55 as an image capturing pattern for the inspection target object (step S56). Specifically, for example, the pattern specifying unit 38 specifies a pattern ID of an image capturing pattern associated with the reference image determined in step S55 in the pattern management DB 3005. The robot 10 stores, for each inspection area, a plurality of image capturing patterns in which an inspection target object is determined to be easily viewable in accordance with an image capturing environment, and specifies the image capturing pattern in which the inspection target object is determined to be most easily viewable, based on the appearance of the test object 6 in a captured image obtained immediately before an image of the inspection target object starts to be captured.

Subsequently, the storing and reading unit 49 searches the image capturing condition management DB 3006 (see FIG. 16) by using the pattern ID of the image capturing pattern specified in step S57 as a search key to read image capturing condition information associated with the same pattern ID as the pattern ID of interest (step S57).

Subsequently, in FIG. 21, the movement control unit 35 moves the robot 10 to an image capturing position indicated in the image capturing condition information read in step S57 (step S58). When the image capturing position information included in the image capturing condition information indicates an image capturing point, the movement control unit 35 moves the robot 10 to the site position indicated in the image capturing point information. For example, when the image capturing position information included in the image capturing condition information indicates reference position distance image capturing, the movement control unit 35 moves the robot 10 by the distance indicated in the reference position distance information.

If the robot 10 has reached the image capturing position (YES in step S59), the determination unit 32 causes the process to proceed to step S61. Specifically, if the current position of the robot 10, which is indicated by the position information acquired by the position information acquisition unit 33, matches or comes close to the image capturing position indicated by the image capturing condition information read in step S57, the determination unit 32 determines that the robot 10 has reached the image capturing position. On the other hand, the control device 30 causes the movement control unit 35 to move the robot 10 until the robot 10 reaches the image capturing position (NO in step S59).

Subsequently, the image capturing condition setting unit 39 sets image capturing conditions corresponding to the reached image capturing position (step S60). Specifically, the image capturing condition setting unit 39 controls the image-capturing-position adjustment device 14 based on the image capturing direction information indicated by the image capturing condition information read in step S57 to set image capturing conditions for the image capturing device 13. Subsequently, the image capturing control unit 36 performs a process of capturing an image of the inspection target object to be imaged at the current image capturing position in accordance with the image capturing conditions set in step S60 (step S61).

If any other inspection target object to be imaged is present (YES in step S62), the control device 30 repeats the process from step S59 and causes the robot 10 to move to the image capturing position of the other inspection target object. On the other hand, if the determination unit 32 determines that no other inspection target object to be imaged is present (NO in step S62), the process ends.

Figure 22:
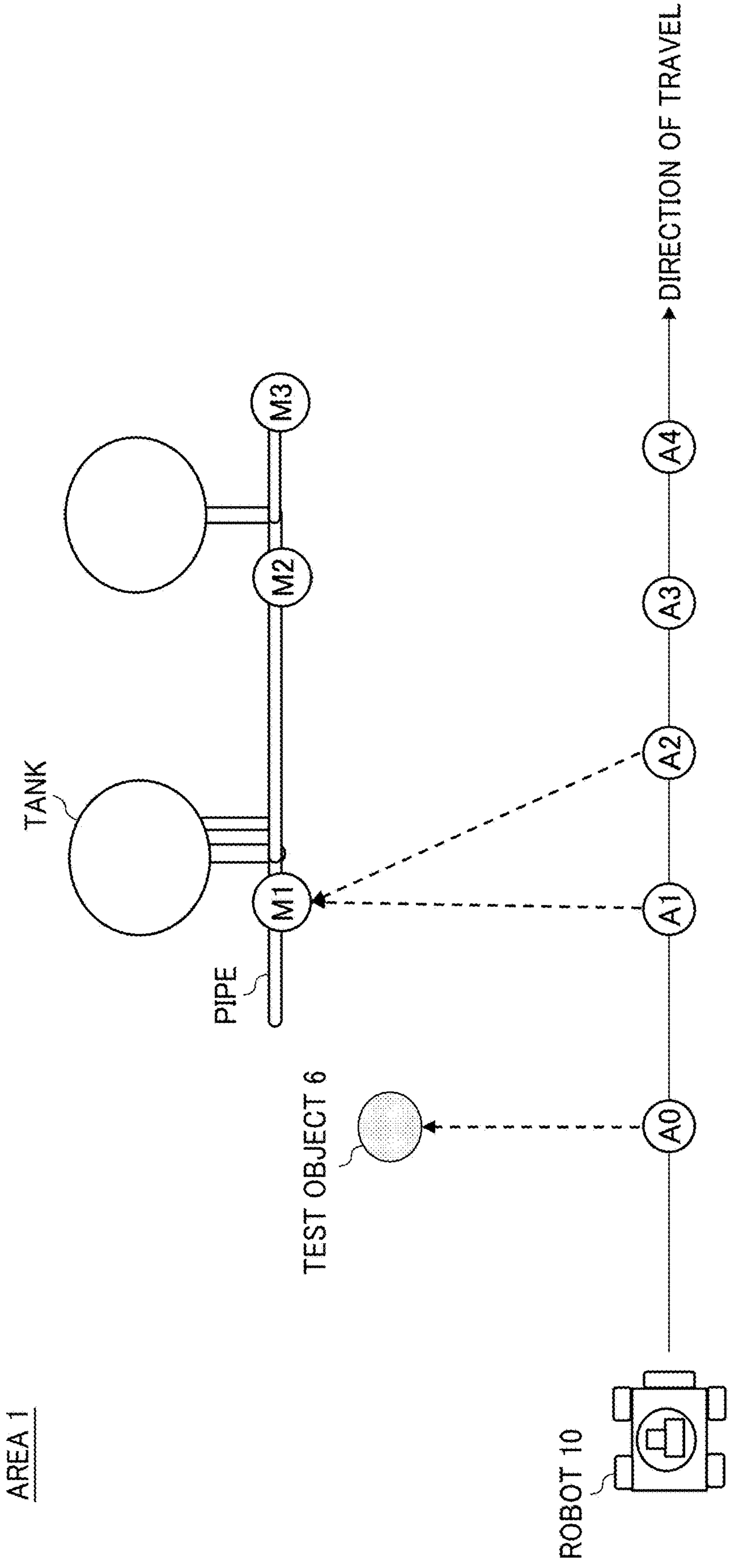
FIG. 22 is a view schematically illustrating an example of an image capturing process using the robot in an inspection area.

The process illustrated in FIGS. 20 and 21 will now be schematically described with reference to FIG. 22. FIG. 22 is a view schematically illustrating an example of an image capturing process using the robot 10 in an inspection area.

Upon reaching a target area where inspection work is to be performed, the robot 10 first moves to a test point A0, which is the image capturing position of the test object 6. Subsequently, the robot 10 performs a process of capturing an image of the test object 6 at the test point A0. As a result, the robot 10 acquires a captured image of the test object 6 in the environment of the current target site.

Subsequently, the robot 10 matches the captured image of the test object 6 against the reference images stored in the pattern management DB 3005 and specifies the image capturing pattern of the inspection target object in the current inspection work. Further, the robot 10 sets image capturing conditions for the inspection target object present in the target object area corresponding to the specified image capturing pattern.

Subsequently, the robot 10 moves to the image capturing position indicated by the set image capturing conditions and performs a process of capturing an image of the inspection target object. In the example illustrated in FIG. 16, for example, the image capturing position of an inspection target object M1 is an image capturing position A1 for the pattern ID "P001" and an image capturing position A2 for the pattern ID "P002". Accordingly, the robot 10 captures an image of an inspection target object by using image capturing conditions under which the inspection target object is determined to be most easily viewable in accordance with the image capturing environment at the time of capturing the image, and thus can acquire a captured image from which the state of the inspection target object can be checked.

Figure 23A:
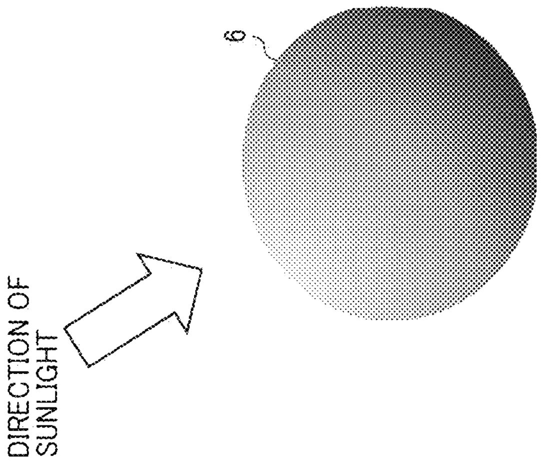
FIGS. 23A to 23C are views illustrating an example of captured states of a test object.
Figure 23B:
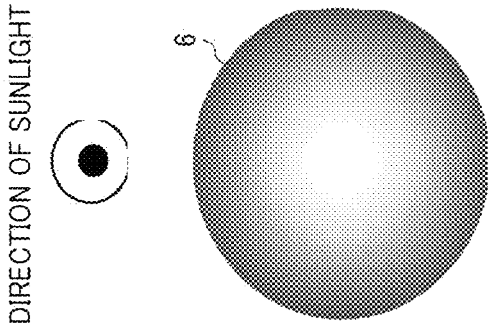
Figure 23C:
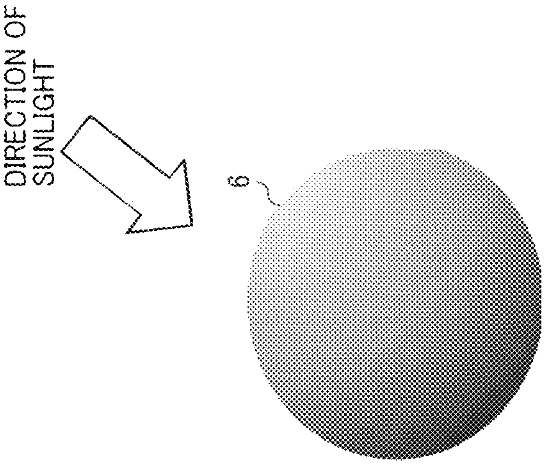

Further, the test object 6 installed in each inspection area at the target site will be described with reference to FIGS. 23A to 25B. FIGS. 23A to 23C include views illustrating an example of captured states of the test object 6. FIGS. 23A to 23C illustrate a difference between the captured states of the test object 6, which is a sphere, depending on the direction of sunlight striking.

As illustrated in FIGS. 23A to 23C how the captured images of the test object 6 appears differs depending on the direction of sunlight striking the test object 6. FIG. 23A illustrates an example in which sunlight strikes the surface of the test object 6 from the upper left. Since the left portion of the test object 6 is rendered less visible due to sunlight reflecting off of it, the test object 6 is more easily viewable when viewed from the slightly right direction. FIG. 23B illustrates an example in which sunlight strikes the test object 6 from the front side. Since a portion near the center of the test object 6 is rendered less visible due to sunlight reflecting off of it, the test object 6 is more easily viewable when viewed at an angle toward the right or left. FIG. 23C illustrates an example in which sunlight strikes the test object 6 from the upper right. Since the right portion of the test object 6 is rendered less visible due to sunlight reflecting off of it, the test object 6 is more easily viewable when viewed at an angle slightly toward the left.

As described above, in the image capturing system 1, the test object 6 is arranged in an inspection area as a reference for setting image capturing conditions, an image of the test object 6 is captured before an image of an inspection target object is captured, and image capturing conditions for the inspection target object are set in accordance with differences in the appearance of the test object 6, which differs depending on, for example, the manner how sunlight strikes the test object 6. As a result, the image capturing system 1 can acquire, by using the robot 10, a captured image of the inspection target object from which the state of the inspection target object can be more easily checked.

Figure 24A:
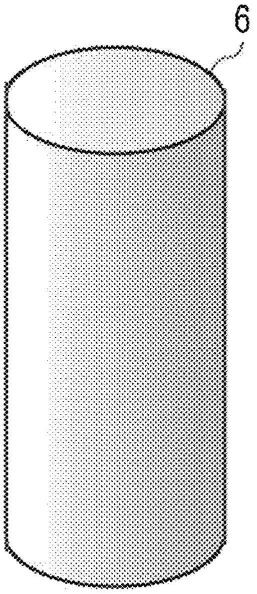
FIGS. 24A and 24B are views illustrating an example of test objects.
Figure 24B:
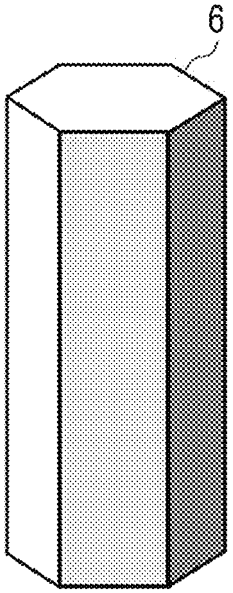

Further, as illustrated in FIGS. 24A to 25B, the test object 6 installed at the target site is not limited to a circular object and may have various shapes. The test object 6 may be, for example, an object having a cylindrical shape as illustrated in FIG. 24A or a polygonal shape as illustrated in FIG. 24B.

Figure 25B:
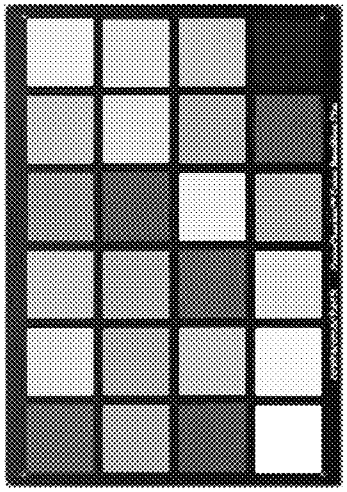
FIGS. 25A and 25B are views illustrating an example of test objects.
Figure 25A:
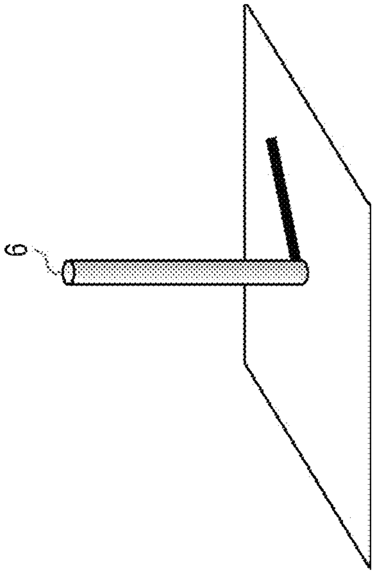

Alternatively, as illustrated in FIG. 25A, the test object 6 may be, for example, a rod-shaped object, and may be configured to specify a difference in the state of the rod-shaped object in captured images by using the shadow of the rod-shaped object. Alternatively, as illustrated in FIG. 25B, for example, the test object 6 may be an image included in a color chart, and may be configured to specify an image capturing pattern by color temperature correction such as white balance adjustment using a captured image of the color chart.

While this embodiment has been described assuming that the test object 6 is installed in each inspection area separately from inspection target objects, the image capturing system 1 may be configured such that one of a plurality of inspection target objects installed in the inspection area is used as the test object 6. In this embodiment, the test object 6 is an example of a first target object. An inspection target object installed in each inspection area at a target site is an example of a second object.

Further, the image capturing system 1 may be configured to set image capturing conditions, based on a captured image of an inspection target object and a reference image, and capture an image of the same inspection target object under the set image capturing conditions. In this case, in the target object image capturing process described above, the processing of steps S58 and S59 illustrated in FIG. 21 is omitted, and the image capturing system 1 performs, in step 61, the image capturing process on the same inspection target object as the inspection target object of which the image is captured in step S54.

Referring back to FIG. 18, the transmission and reception unit 31 of the control device 30 transmits, to the image management server 50, the captured image data acquired in the inspection process performed in step S13 and the target object information of the inspection target object corresponding to the captured image data (step S14). Thus, the transmission and reception unit 51 of the image management server 50 receives the captured image data and the target object information transmitted from the robot 10. Subsequently, the storing and reading unit 59 of the image management server 50 stores the received captured image data in the captured image management DB 5001 (see FIG. 17) in association with the area ID received in step S11 and the target object ID and target object name indicated by the target object information received in step S14 (step S15).

The administrator at the management site causes the communication terminal 70 to display the captured image acquired in the target object inspection process described above and stored in the image management server 50 to check the state of the inspection target object. The image capturing conditions managed in the image capturing condition management DB 3006 described above (see FIG. 16) are set as parameters for acquiring a captured image in which each inspection target object is easily viewable to the administrator who checks the captured image.

The robot 10 may perform a process of capturing an image of an inspection target object as described above and may also use a technique such as image recognition on the captured image to perform a process of detecting the presence or absence of abnormality of the inspection target object of which the image is captured. This allows the administrator to check the captured image of the inspection target object and the detection result such as the occurrence of abnormality in the inspection target object, which is obtained by the robot 10. In this case, the image capturing conditions managed in the image capturing condition management DB 3006 (see FIG. 16) may be set as parameters within a range in which the robot 10 can perform processing such as image recognition, instead of as parameters for acquiring an image with which a state is easily viewable by the administrator.

Image Capturing Pattern Registration Process

Online Processing during Inspection Work by Robot 10

Next, a process for registering an image capturing pattern to be used to capture an image of an inspection target object will be described with reference to FIGS. 26 to 36B. In the target object inspection process described above, description has been given of an example in which image capturing conditions corresponding to different patterns are stored in advance in the image capturing condition management DB 3006 (see FIG. 16). FIGS. 26 to 36B illustrate an example in which no image capturing pattern is stored when an image of a target object is captured, and a captured image of an inspection target object is viewed to the administrator to register desired conditions. In the following description, the process performed until the robot 10 reaches the target inspection area is similar to the process illustrated in FIG. 18, and the description thereof will thus be omitted.

Figure 26:
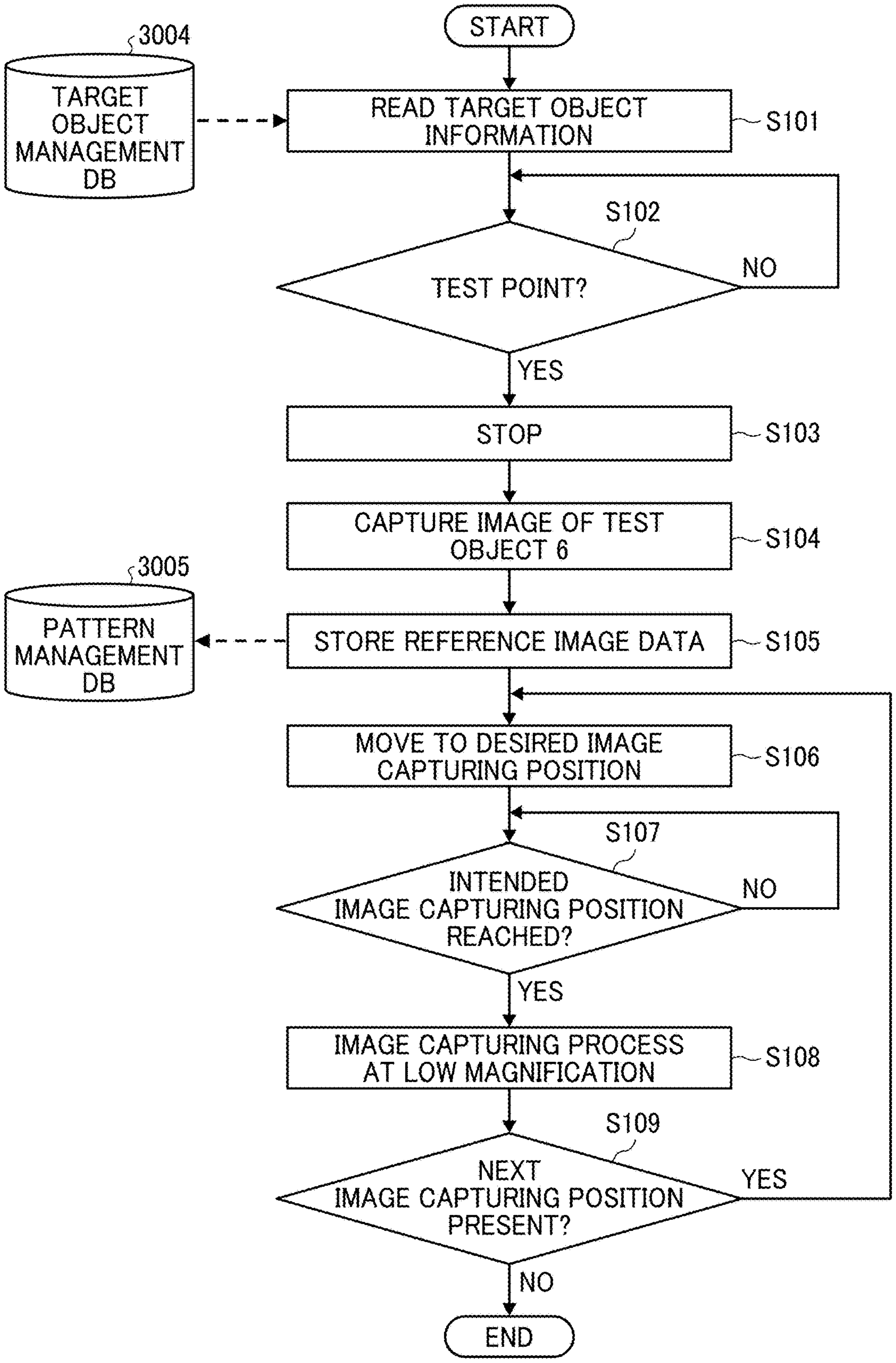
FIG. 26 is a flowchart illustrating an example of a target object image capturing process when no image capturing condition is registered.

FIG. 26 is a flowchart illustrating an example of a target object image capturing process when no image capturing condition is registered. Since the processing of steps S101 to S104 is similar to the processing of steps S51 to S54 illustrated in FIG. 20, the description thereof will be omitted.

In step S105, the storing and reading unit 49 stores the captured image of the test object 6, which is obtained in step S104, in the pattern management DB 3005 (see FIG. 15) as reference image data. In this case, the storing and reading unit 49 stores the captured image data of the test object 6 in one record of the pattern management table in association with a newly assigned pattern ID.

Subsequently, the movement control unit 35 moves the robot 10 to a desired image capturing position in the inspection area along the moving route set by the movement destination setting unit 34 (step S106). Specifically, the movement destination setting unit 34 sets a plurality of site positions along the set moving route as desired image capturing positions. Subsequently, the movement control unit 35 moves the robot 10 to the set desired image capturing positions.

If the robot 10 has reached an intended image capturing position (YES in step S107), the determination unit 32 causes the process to proceed to step S108. Specifically, if the current position of the robot 10, which is indicated by the position information acquired by the position information acquisition unit 33, matches or comes close to the image capturing position set in step S106, the determination unit 32 determines that the robot 10 has reached the intended image capturing position. On the other hand, the control device 30 causes the movement control unit 35 to move the robot 10 until the robot 10 reaches the intended image capturing position (NO in step S107).

Subsequently, the image capturing control unit 36 performs a process of capturing an image of the inspection target object at low magnification (step S108). Specifically, the image capturing condition setting unit 39 sets a low-magnification image capturing condition with a low amount of zoom (Z) such that an image in which a plurality of inspection target objects in the inspection area appear at the same time can be captured at the reached image capturing position. The image capturing control unit 36 performs a process of capturing an image at low magnification, based on the set image capturing condition. Subsequently, the image capturing control unit 36 acquires an overhead-view image, which is a captured image of the plurality of inspection target objects in the inspection area.

If the determination unit 32 determines that the next image capturing position is present (YES in step S109), the control device 30 repeats the process from step S106 and repeats the movement to the next image capturing position and the execution of the image capturing process. On the other hand, if the determination unit 32 determines that no next image capturing position is present (NO in step S109), the control device 30 ends the process of capturing images of the inspection target objects.

Accordingly, the robot 10 captures images of inspection target objects present in an inspection area from different image capturing positions to acquire a plurality of overhead-view images in which the inspection target objects appear differently. Next, a process for registering image capturing conditions for an inspection target object by using a captured image acquired by the robot 10 will be described with reference to FIGS. 27 to 30.

Figure 27:
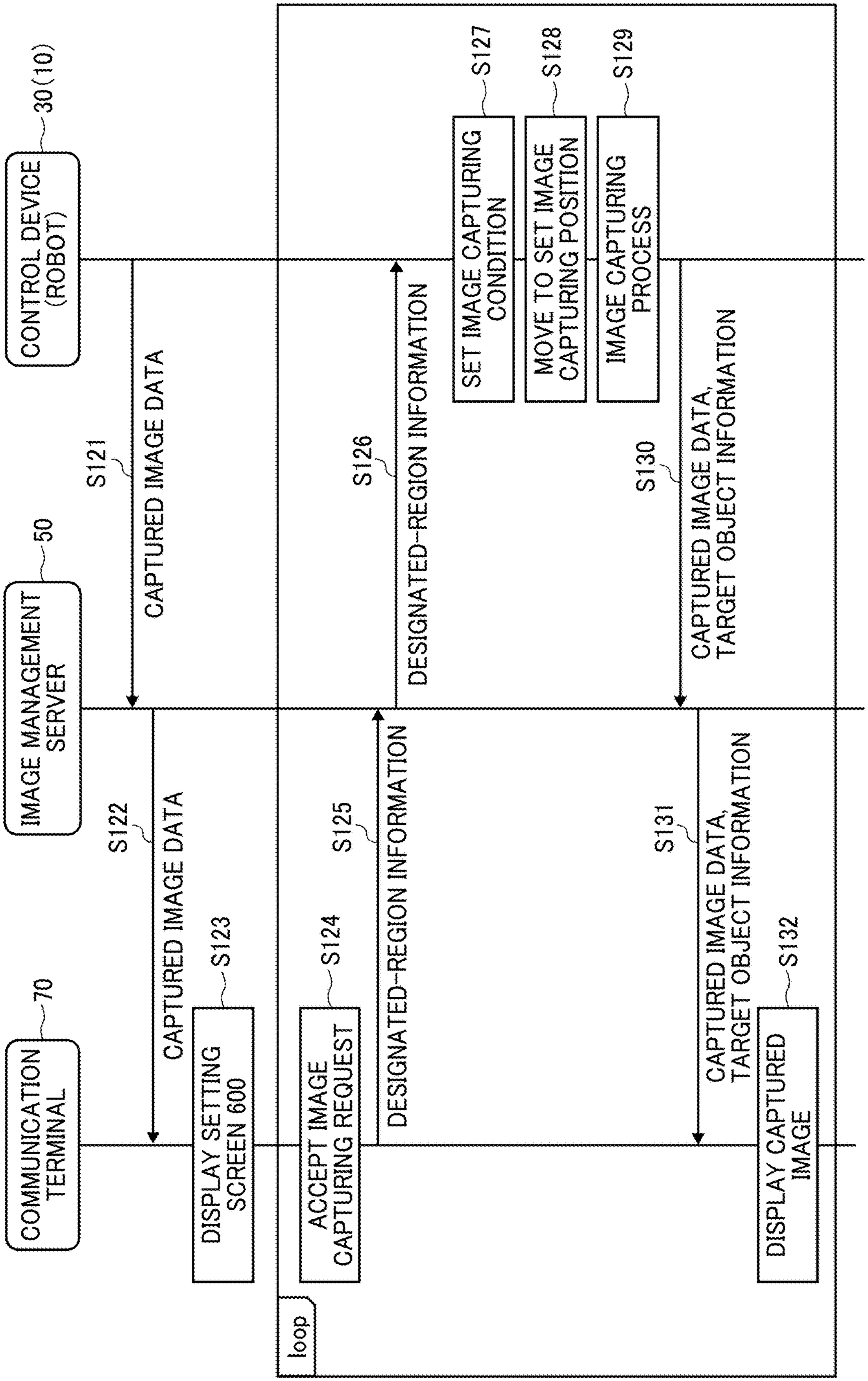
FIG. 27 is a sequence diagram illustrating an example of an image capturing condition registration process in the image capturing system.
Figure 30:
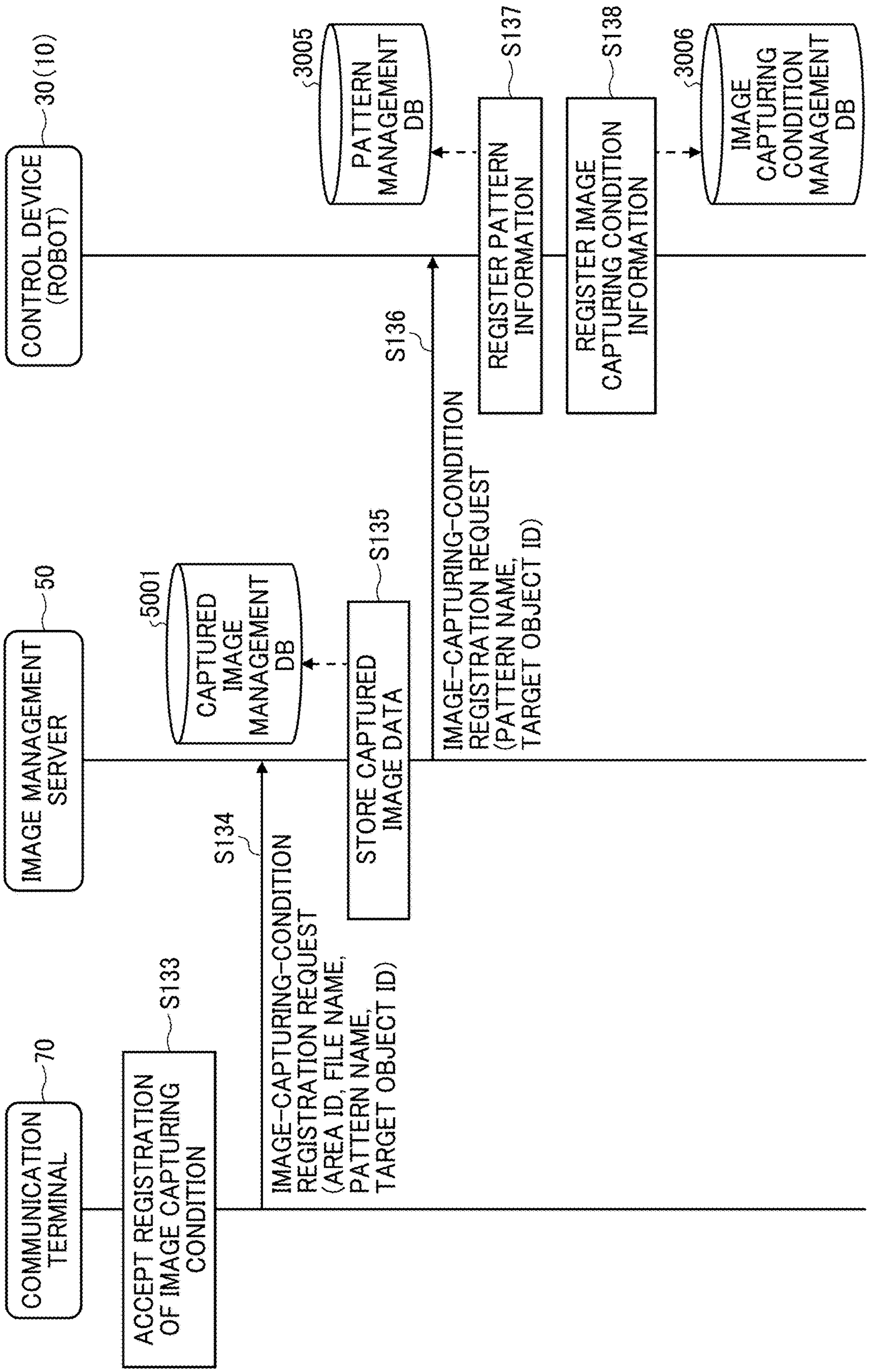
FIG. 30 is a sequence diagram illustrating an example of an image capturing condition registration process in the image capturing system.

FIGS. 27 and 30 are sequence diagrams illustrating an example of an image capturing condition registration process in the image capturing system. The transmission and reception unit 31 of the control device 30 included in the robot 10 transmits the captured image data acquired in step S108 to the image management server 50 (step S121). The transmission and reception unit 51 of the image management server 50 transmits (transfers) the captured image data transmitted from the robot 10 to the communication terminal 70 (step S122). Thus, the transmission and reception unit 71 of the communication terminal 70 receives the captured image data transmitted (transferred) from the image management server 50.

Figure 28:
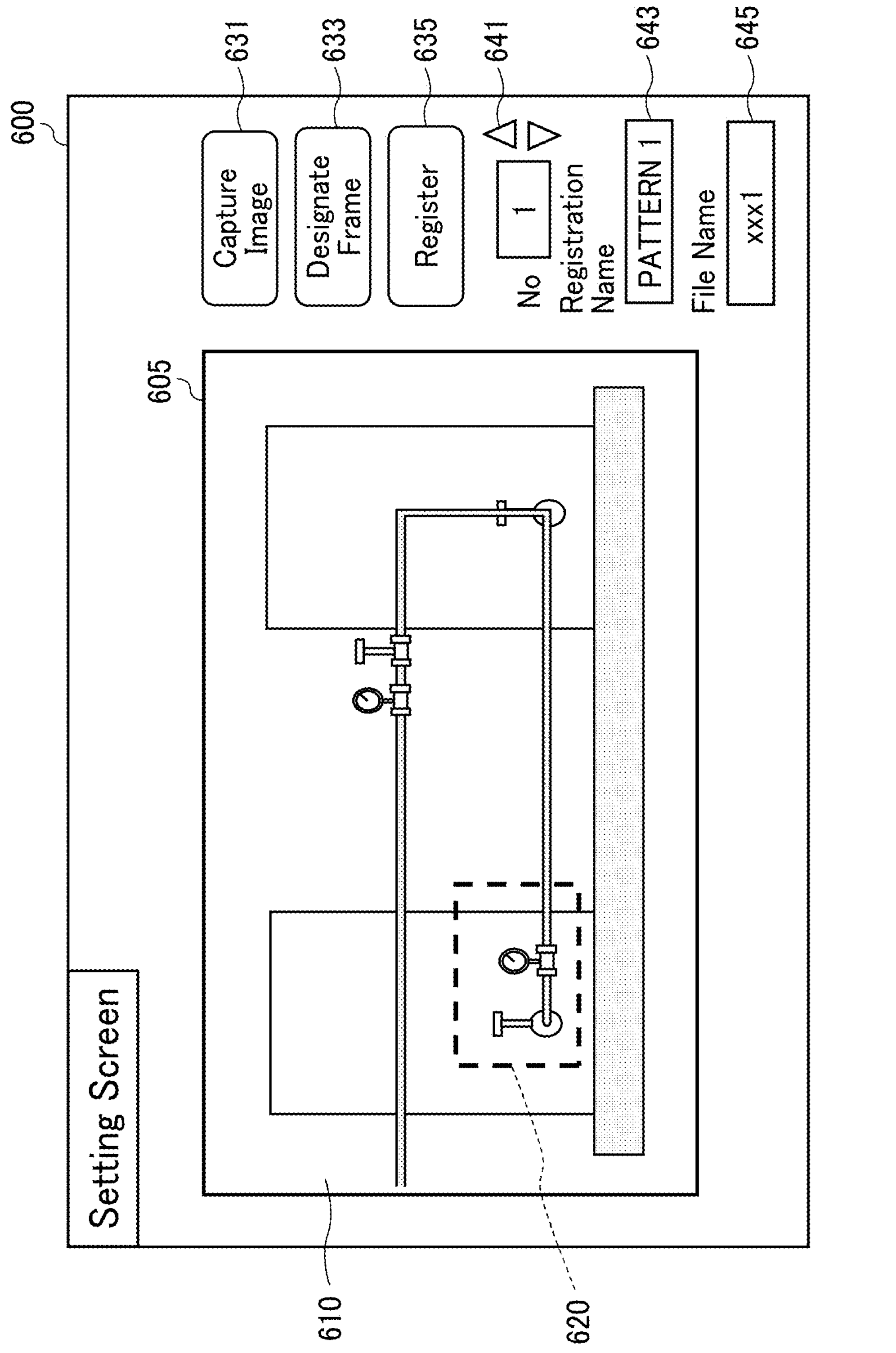
FIG. 28 is a view illustrating an example of a setting screen.

Subsequently, the display control unit 73 of the communication terminal 70 causes the display 706 to display a setting screen 600 for setting image capturing conditions for the inspection target objects (step S123). FIG. 28 is a view illustrating an example of the setting screen displayed on the communication terminal. The setting screen 600 illustrated in FIG. 28 is a display screen for registering image capturing conditions for the inspection target objects within the inspection area by using an overhead-view image in which the entire inspection area appears. The administrator A uses the setting screen 600 to set image capturing conditions for capturing an image of a predetermined region in the captured image being displayed.

The setting screen 600 includes a captured image display area 605 for displaying a captured image 610 corresponding to the captured image data received in step S122, and a designation range 620 for designating a predetermined region in the captured image 610 displayed in the captured image display area 605. The setting screen 600 also includes a "Capture image" button 631 to be pressed to make a request to capture an image of an inspection target object corresponding to the designation range 620, a "Designate range" button 633 to be pressed to display the designation range 620, and a "Register" button 635 to be pressed to register the image capturing conditions for the captured image displayed in the captured image display area 605 as an image capturing pattern. The setting screen 600 further includes an image switching button 641 for switching the captured image 610 to be displayed in the captured image display area 605, a registration name input field 643 for inputting the pattern name of the image capturing pattern to be registered, and a file name input field 645 for inputting the file name of the captured image displayed in the captured image display area 605.

Referring back to FIG. 27, in response to the administrator A designating a region by using the designation range 620 and pressing the "Capture image" button 631, the acceptance unit 72 of the communication terminal 70 accepts a request for capturing an image of the designated region (step S124). Subsequently, the transmission and reception unit 71 transmits, to the image management server 50, designated-region information indicating a predetermined region in the captured image 610, which is designated in step S124 (step S125). The transmission and reception unit 51 of the image management server 50 transmits (transfers) the designated-region information transmitted from the communication terminal 70 to the robot 10. Thus, the transmission and reception unit 31 of the control device 30 included in the robot 10 receives the designated-region information transmitted (transferred) from the image management server 50.

Subsequently, the image capturing condition setting unit 39 of the control device 30 sets image capturing conditions for an image capturing process using the image capturing device 13, based on the designated-region information received in step S126 (step S127). Specifically, the image capturing condition setting unit 39 identifies the image capturing position and the image capturing direction of the intended inspection target object, based on the position and the orientation of the inspection target object in the region corresponding to the received designated-region information. Subsequently, the image capturing condition setting unit 39 controls the image-capturing-position adjustment device 14 to face in the identified image capturing direction to set image capturing conditions for the image capturing device 13. Further, the movement destination setting unit 34 sets the identified image capturing position as the movement destination of the robot 10.

Subsequently, the movement control unit 35 moves the robot 10 toward the set image capturing position (step S128). In response to the set image capturing position being reached, the image capturing control unit 36 performs a process of capturing an image of the inspection target object in accordance with the set image capturing conditions (step S129). Subsequently, the image capturing control unit 36 acquires an enlarged image that is a captured image of the inspection target object corresponding to the designated predetermined region.

The transmission and reception unit 31 transmits, to the image management server 50, the captured image data of the inspection target object, which is obtained in step S128, and the target object information of the inspection target object of which the image is captured (step S130). The transmission and reception unit 51 of the image management server 50 transmits (transfers) the captured image data and the target object information transmitted from the robot 10 to the communication terminal 70 (step S131). Thus, the transmission and reception unit 71 of the communication terminal 70 receives the captured image data and the target object information transmitted (transferred) from the image management server 50.

Figure 29:
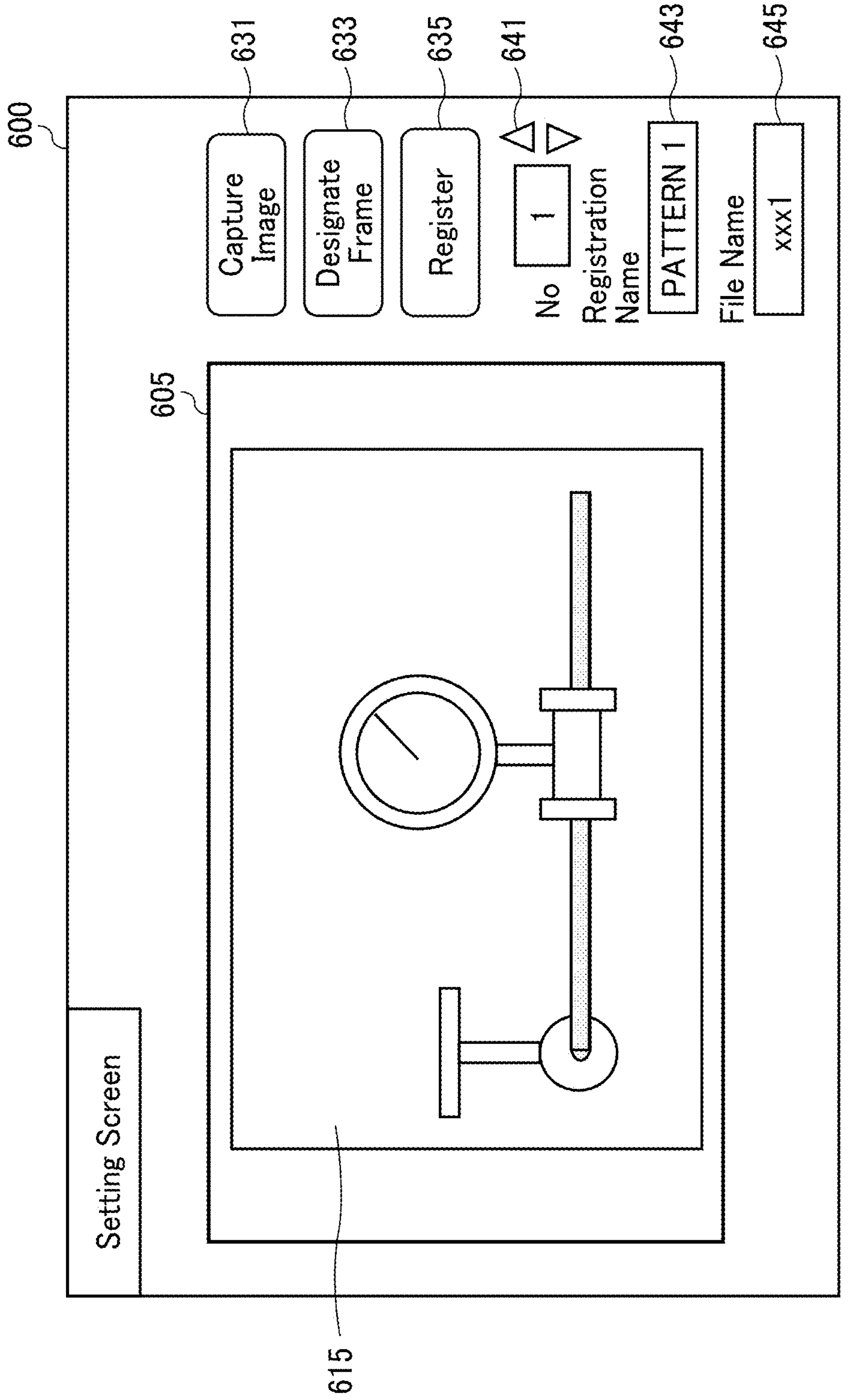
FIG. 29 is a view illustrating an example of a setting screen.

Subsequently, as illustrated in FIG. 29, the display control unit 73 of the communication terminal 70 displays a captured image 615 corresponding to the captured image data received in step S131 in the captured image display area 605 (step S132). In the setting screen 600 illustrated in FIG. 29, the captured image 615, which is an enlarged image of the designation range 620 illustrated in FIG. 28, is displayed in the captured image display area 605.

Subsequently, in FIG. 30, the acceptance unit 72 accepts a request for registering the image capturing conditions in response to the administrator A pressing the "Register" button 635 when the captured image 615 is being displayed in the captured image display area 605 (step S133). If it is difficult for the administrator to check the state of the inspection target object from the displayed captured image 615, the administrator again selects the designation range 620 to change the image capturing position of the robot 10. In this case, the image capturing system 1 repeats the process from step 124.

Subsequently, the transmission and reception unit 71 transmits, to the image management server 50, the request for registering the image capturing conditions for the captured image 615 displayed in the captured image display area 605 (step S134). The image-capturing-condition registration request includes the area ID of the inspection area in which the inspection target object is installed, the file name input in the file name input field 645, the pattern name input in the registration name input field 643, and the target object ID indicated in the target object information received in step S131. Thus, the transmission and reception unit 51 of the image management server 50 receives the image-capturing-condition registration request transmitted from the communication terminal 70.

Subsequently, the storing and reading unit 59 of the image management server 50 stores the captured image data received in step S131 in the captured image management DB 5001 (see FIG. 17) in association with the area ID and the target object ID received in step S134 (step S135). Subsequently, the transmission and reception unit 51 of the image management server transmits the image-capturing-condition registration request to the robot 10 (step S136). The image-capturing-condition registration request includes the pattern name and the target object ID received in step S134. Thus, the transmission and reception unit 31 of the control device 30 included in the robot 10 receives the image-capturing-condition registration request transmitted from the image management server 50.

The registration unit 41 of the control device 30 registers, in the pattern management DB 3005 (see FIG. 15), pattern information in which the pattern name received in step S136 is associated with the reference image data stored in step S105 (step S137). Subsequently, the registration unit 41 registers image capturing condition information indicating the image capturing conditions for the image capturing process in step S129 in the image capturing condition management DB 3006 (see FIG. 16) in association with the target object ID received in step S136 and the pattern ID indicated in the pattern information registered in step S137 (step S138).

As described above, the image capturing system 1 can register a captured image of the test object 6 and image capturing conditions corresponding to the image capturing environment in which an image of an inspection target object is captured, in association with each other. In addition, the image capturing system 1 repeatedly performs the image capturing condition registration process described above in image capturing environments with different sunlight conditions and the like, and thus can register image capturing conditions under which an inspection target object corresponding to each of the various image capturing environments is easily viewable.

Online Processing After Inspection Work by Robot 10

Next, a process in which the administrator A registers an image capturing pattern by using a captured image after the inspection work by the robot 10 is completed will be described with reference to FIGS. 31 to 34. The robot 10 uploads a captured image of an inspection target object, which is obtained in the inspection work, to the image management server 50. The administrator A performs, at a desired time, a process of registering the image capturing pattern of the inspection target object while checking the captured image uploaded to the image management server 50. The details will be described hereinafter.

Figure 31:
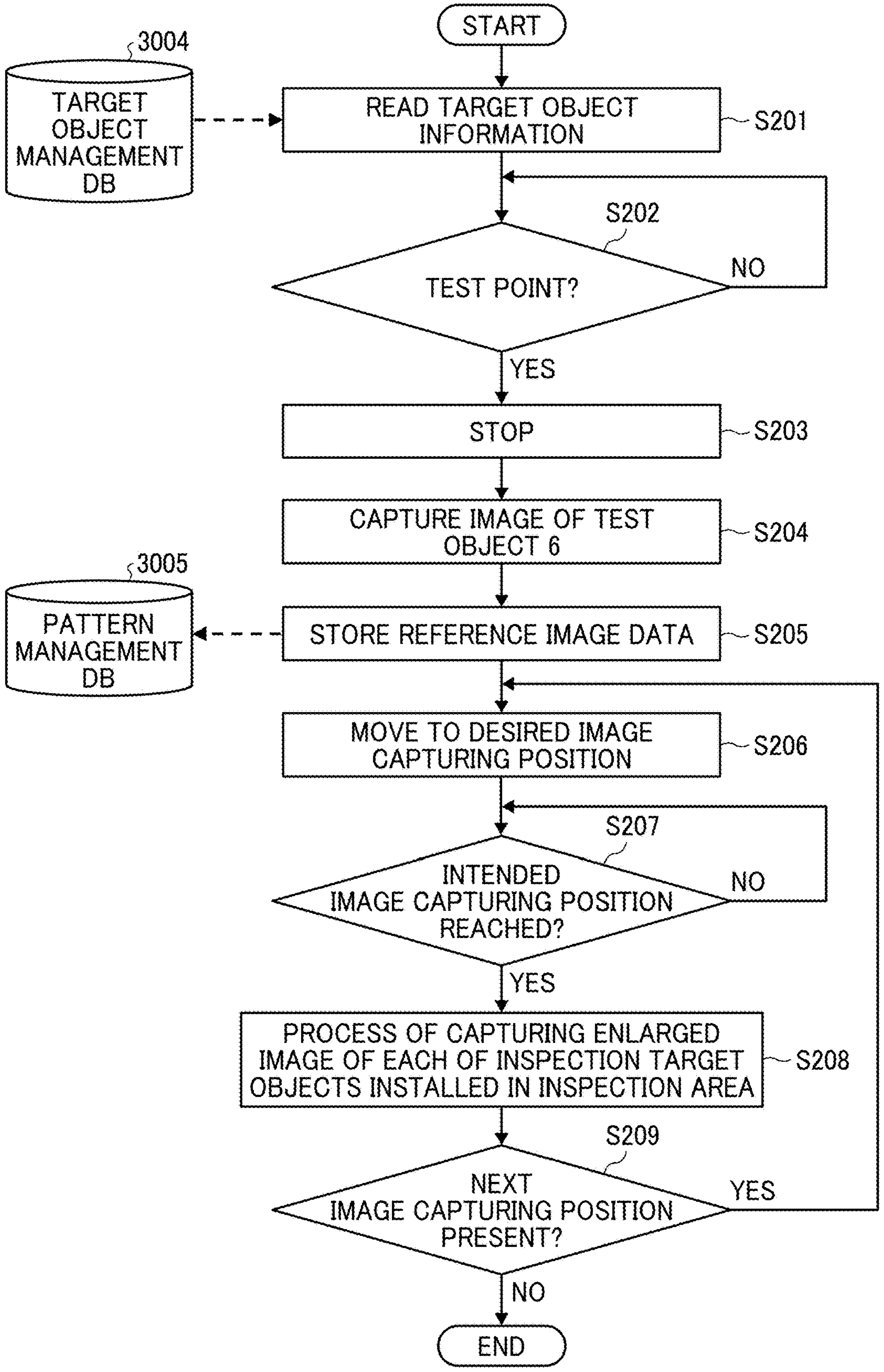
FIG. 31 is a flowchart illustrating an example of a target object image capturing process when no image capturing condition is registered.

FIG. 31 is a flowchart illustrating an example of a target object image capturing process when no image capturing condition is registered. The process illustrated in FIG. 31 is different from the process illustrated in FIG. 26 only in the processing of step S208. In step S208, the image capturing control unit 36 performs a process of capturing an enlarged image of an inspection target object. Specifically, the image capturing condition setting unit 39 sets a high-magnification image capturing condition with a high amount of zoom (Z) such that an enlarged image of each inspection target object in the inspection area is captured at the reached image capturing position. The image capturing control unit 36 performs a process of capturing an image of an inspection target object present in the intended inspection area, based on the set image capturing condition. Subsequently, the image capturing control unit 36 acquires enlarged images, which are individually captured images of the respective inspection target objects in the inspection area. Since the processing of the other steps, namely, steps S201 to S207 and step S209, illustrated in FIG. 31 is similar to the processing of steps S101 to S107 and step S109 in FIG. 26, respectively, the description thereof will be omitted.

Figure 32:
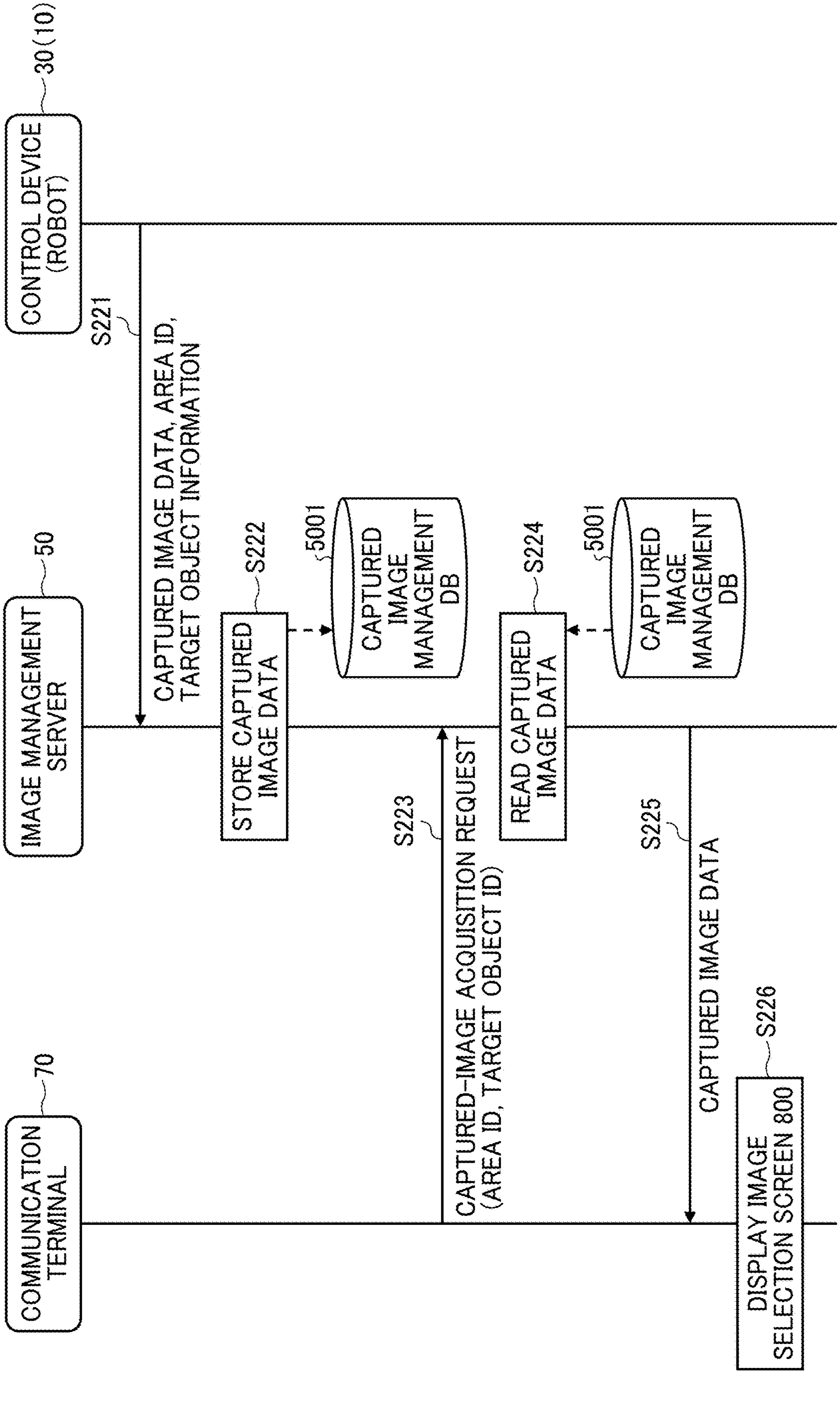
FIG. 32 is a sequence diagram illustrating an example of an image capturing condition registration process in the image capturing system.

Next, a process for registering image capturing conditions for an inspection target object by using a captured image uploaded to the image management server 50 after the inspection work by the robot 10 is completed will be described with reference to FIGS. 32 to 34. FIGS. 32 and 34 are sequence diagrams illustrating an example of an image capturing condition registration process in the image capturing system 1. The transmission and reception unit 31 of the control device 30 included in the robot 10 transmits, to the image management server 50, the captured image data acquired in step S208, the area ID of the inspection area in which the inspection target object of which the image is captured in step S208 is installed, and the target object information of the inspection target object (step S221). Thus, the transmission and reception unit 51 of the image management server 50 receives the captured image data, the area ID, and the target object information transmitted from the robot 10. Subsequently, the storing and reading unit 59 of the image management server 50 stores the received captured image data in the captured image management DB 5001 (see FIG. 17) in association with the area ID and the target object ID and target object name indicated by the target object information, which are received in step S221 (step S222).

Subsequently, in response to the administrator A located at the management site performing an input operation or the like on the input means of the communication terminal 70, the transmission and reception unit 71 of the communication terminal 70 transmits, to the image management server 50, a captured-image acquisition request indicating a request for acquiring a captured image of the inspection target object (step S223). The captured-image acquisition request includes a target object ID for identifying the inspection target object. Thus, the transmission and reception unit 51 of the image management server 50 receives the captured-image acquisition request transmitted from the communication terminal 70.

Subsequently, the storing and reading unit 59 of the image management server 50 searches the captured image management DB 5001 by using the target object ID received in step S223 as a search key to read the captured image data associated with the same target object ID as the received target object ID (step S224). Subsequently, the transmission and reception unit 51 transmits the captured image data read in step S224 to the communication terminal 70 from which the request is transmitted. Thus, the transmission and reception unit 71 of the communication terminal 70 receives the captured image data transmitted from the image management server 50.

Subsequently, the display control unit 73 of the communication terminal 70 causes the display 706 to display an image selection screen 800 in which the captured image data received in step S224 is displayed (step S226). FIG. 33 is a view illustrating an example of the image selection screen displayed on the communication terminal. The image selection screen 800 illustrated in FIG. 29 is a display screen for registering image capturing conditions for an inspection target object corresponding to an image capturing environment by using a plurality of captured images of the inspection target object.

The image selection screen 800 includes a captured image display area 810 for displaying a plurality of captured images 820 (820*a* and 820*b*) corresponding to the captured image data received in step S226, an image switching button 830 for switching the captured image to be displayed in the captured image display area 810, a registration name input field 840 for inputting the pattern name of the image capturing pattern to be registered, and a "Register" button 850 to be pressed to register the image capturing conditions for the selected captured image as an image capturing pattern. The captured image display area 810 includes, for each of the displayed captured images, a selection field 825 (825*a* and 825*b*) for selecting a captured image. The example in FIG. 33 illustrates a state in which the administrator A has selected the captured image 820*a*.

Subsequently, in FIG. 34, in response to the administrator A making an input to the selection field 825, the acceptance unit 72 of the communication terminal 70 accepts selection of a captured image (step S227). The example in FIG. 33 illustrates a state in which the administrator A has selected the captured image 820*a*. In response to the administrator A pressing the "Register" button 850, the transmission and reception unit 71 transmits, to the image management server 50, a request for registering the image capturing conditions for the captured image 820 selected in step S227 (step S228). The image-capturing-condition registration request includes the pattern name input to the registration name input field 840, the target object ID transmitted in step S223, and the captured image data selected in step S227. Thus, the transmission and reception unit 51 of the image management server 50 receives the image-capturing-condition registration request transmitted from the communication terminal 70.

Subsequently, the storing and reading unit 59 of the image management server 50 updates the captured image data stored in the captured image management DB 5001 in association with the target object ID received in step S228 to the captured image data received in step S228 (step S229). Subsequently, the transmission and reception unit 51 of the image management server 50 transmits the image-capturing-condition registration request to the robot 10 (step S230). The image-capturing-condition registration request includes the pattern name and the target object ID received in step S227 and image identification information such as the file name for identifying the captured image data updated in step S229. Thus, the transmission and reception unit 31 of the control device 30 included in the robot 10 receives the image-capturing-condition registration request transmitted from the image management server 50.

The registration unit 41 of the control device 30 registers, in the pattern management DB 3005 (see FIG. 15), pattern information in which the pattern name received in step S230 is associated with the reference image data stored in step S205 (step S231). Subsequently, the registration unit 41 registers image capturing condition information indicating the image capturing conditions at the time of capturing the captured image data corresponding to the image identification information received in step S230 in the image capturing condition management DB 3006 (see FIG. 16) in association with the target object ID received in step S230 and the pattern ID indicated in the pattern information registered in step S231 (step S231).

In the image capturing system 1, as described above, the robot 10 uploads captured images of an inspection target object to the image management server 50, and, after the inspection work with the robot 10 is completed, the administrator selects the most visible image from among the captured images and registers image capturing conditions corresponding to the image capturing environment. Such offline processing can be performed. Accordingly, in the image capturing system 1, once the administrator registers image capturing conditions for inspection target objects, the robot 10 can capture images of the inspection target objects while automatically circulating through the moving route, thereby reducing the labor of the administrator for the registration work.

Figure 33:
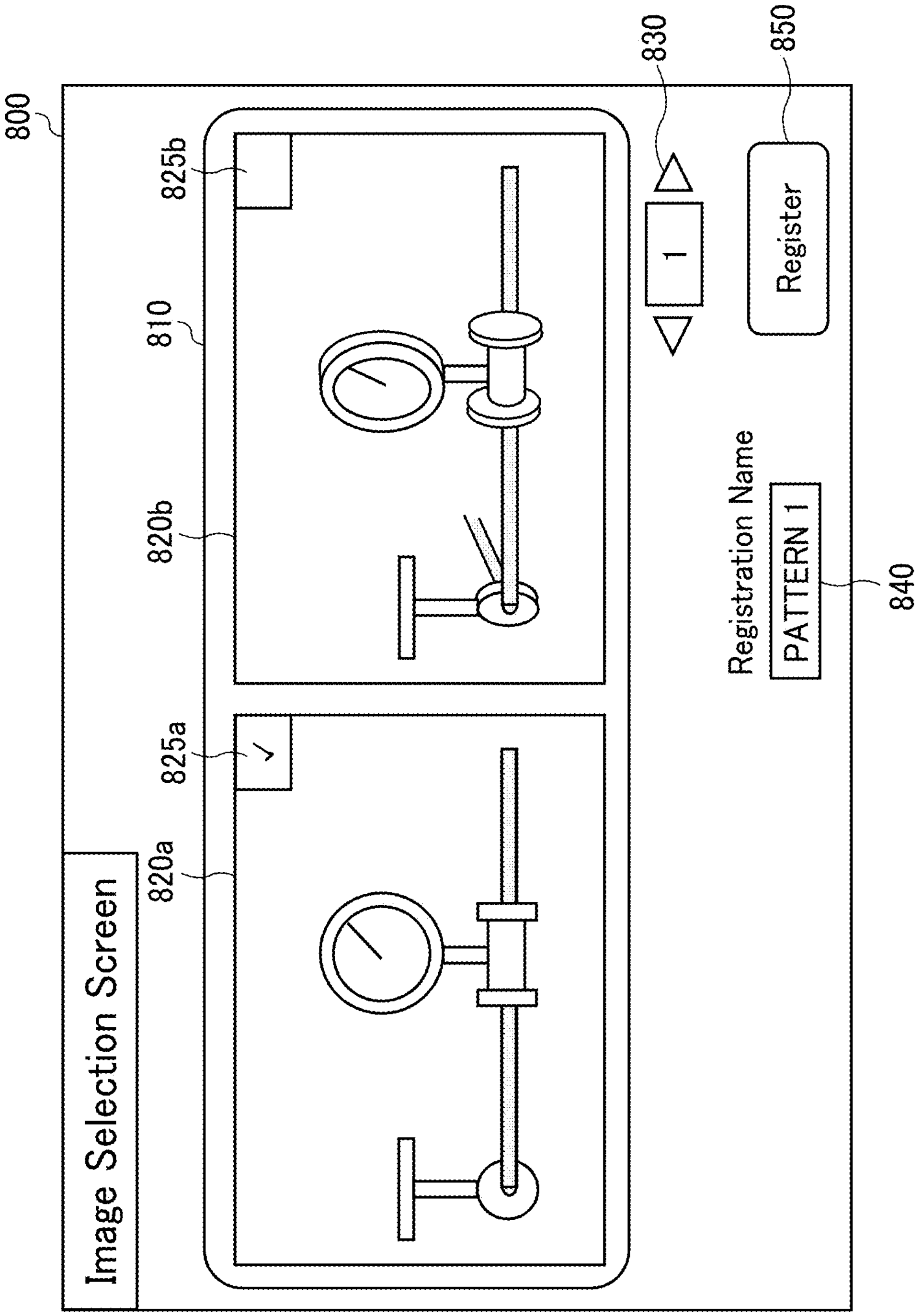
FIG. 33 is a view illustrating an example of an image selection screen.

The image capturing system 1 may be configured to perform the online processing illustrated in FIGS. 26 to 30 such that, instead of an overhead-view image of the inspection area, captured images of an inspection target object as illustrated in FIG. 33 are captured and displayed. Further, the image capturing system 1 may be configured to perform the offline processing illustrated in FIGS. 31 to 34 such that an overhead-view image of the inspection area as illustrated in FIG. 28 is captured and displayed. In this case, the image capturing system 1 registers image capturing conditions for a predetermined region designated in the overhead-view image as image capturing conditions for inspection target objects included in the predetermined region.

In addition, the image capturing system 1 repeatedly performs the process described above such that image capturing conditions suitable for differences in image capturing environment such as sunlight conditions can be selected, and can achieve optimum image capturing conditions. Specifically, the robot 10 updates the image capturing condition information managed in the image capturing condition management DB 3006 by using, for example, the image capturing conditions set in step S127 and the pattern name and the target object ID received in step S136 as inputs. Alternatively, the robot 10 updates the image capturing condition information managed in the image capturing condition management DB 3006 by using, for example, the image capturing condition set in step S208 and the pattern name, the target object ID, and the image identification information received in step S230 as inputs. Subsequently, the robot 10 performs a process of capturing an image of the inspection target object by using, as an output, the image capturing condition information read in step S57, based on the updated image capturing conditions. Accordingly, the image capturing system 1 updates the data managed in the image capturing condition management DB 3006 by machine learning, as appropriate, and thus can improve the accuracy of capturing an image of an inspection target object.

Figure 35:
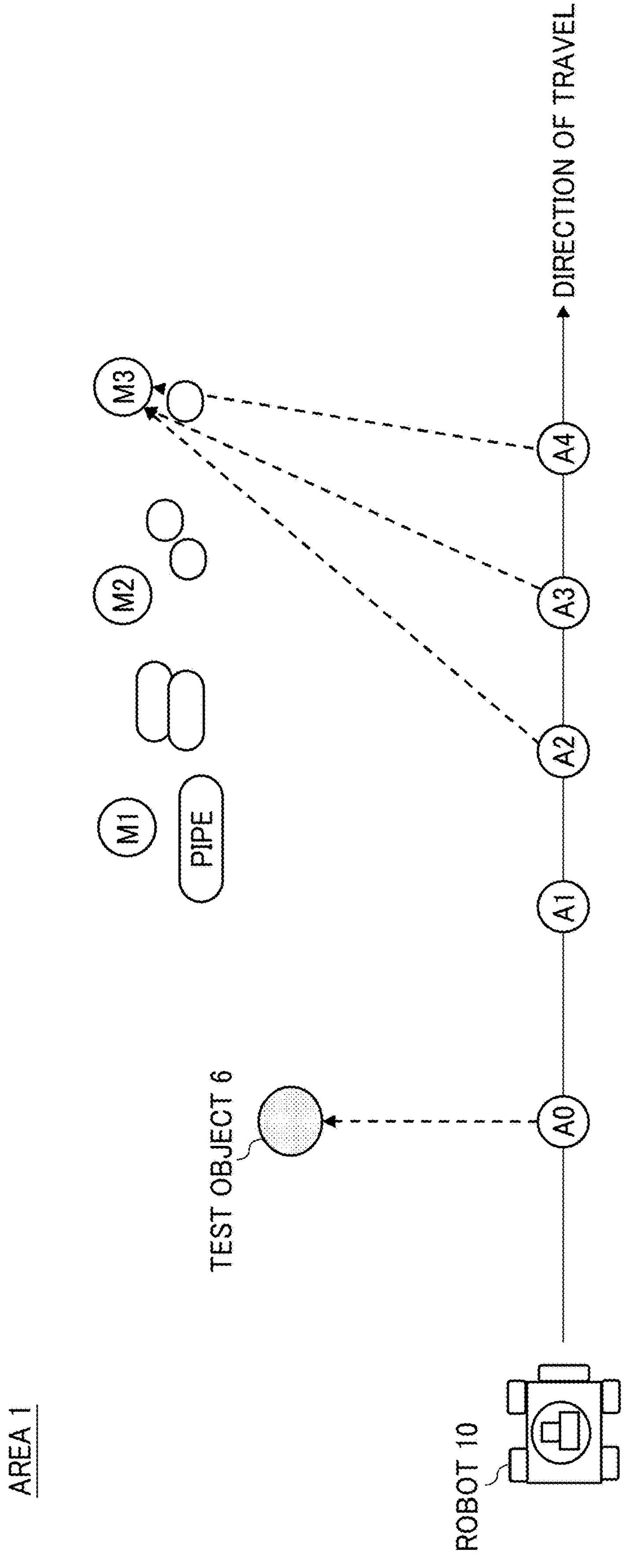
FIG. 35 is a view schematically illustrating another example of the image capturing process using the robot in the inspection area.
Figure 36A:
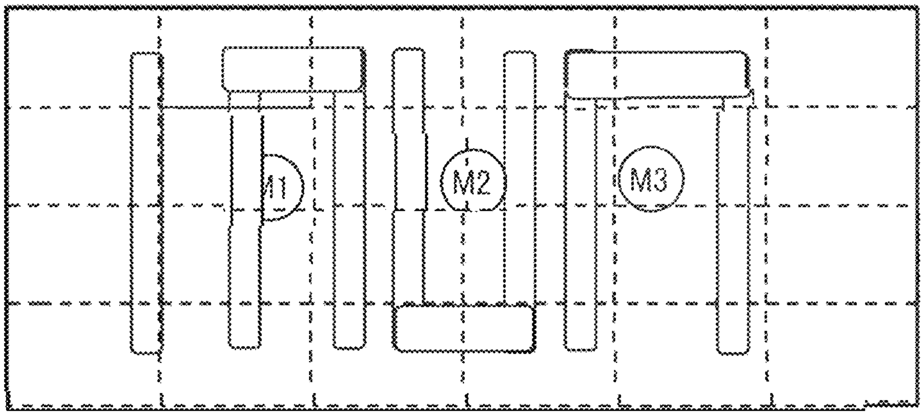
FIG. 36A is a view illustrating an example of a captured image obtained at an image capturing point A3.
Figure 36B:
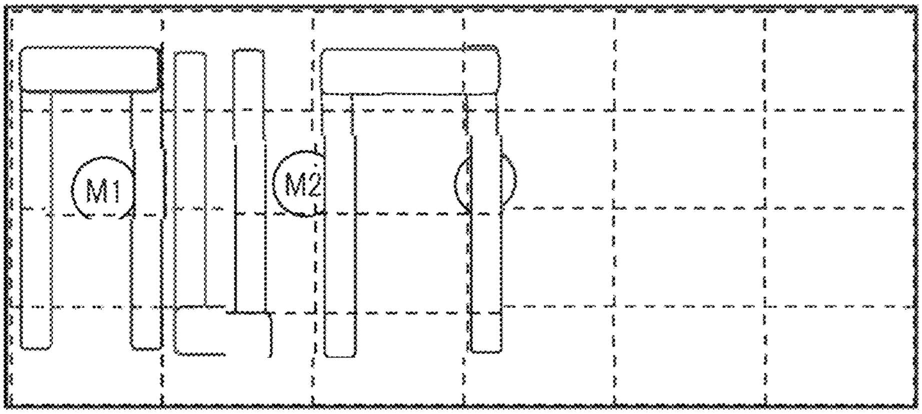
FIG. 36B is a view illustrating an example of a captured image obtained at an image capturing point A4.

The administrator may register image capturing conditions in consideration of factors other than sunlight conditions while viewing the captured image displayed on the communication terminal 70. FIG. 35 is a view schematically illustrating another example of the image capturing process using the robot 10 in the inspection area. As illustrated in FIG. 35, an inspection target object M3 is viewable from image capturing points A2 and A3 but is not viewable from an image capturing point A4. FIG. 36A is a view illustrating an example of a captured image obtained at the image capturing point A3, and FIG. 36B is a view illustrating an example of a captured image obtained at the image capturing point A4. As described above, an inspection target object is shadowed or hidden by another structure in the target site depending on the image capturing position as well as the sunlight conditions. Accordingly, the administrator may determine, in addition to the sunlight conditions, a captured image to be registered as an image capturing condition to deal with occlusion that is a situation in which an inspection target is shadowed by another structure within the target site.

Effects of Embodiment

In the image capturing system 1, as described above, the test object 6 is installed in each inspection area at a target site, and the robot 10 captures an image of the test object 6 before inspection work is started in the inspection area. In the image capturing system 1, furthermore, image capturing conditions indicating an image capturing position and an image capturing direction of an inspection target object set in the inspection area are set from an analysis result of a captured image of the test object 6. In the image capturing system 1, the robot 10 is moved to a set image capturing position to capture an image of the inspection target object in accordance with the set image capturing direction. Accordingly, in the image capturing system 1, an image of the inspection target object is captured by using image capturing conditions corresponding to an image capturing environment such as sunlight conditions that change with the inspection time of day or the weather. As a result, a captured image from which the state of the inspection target object is readable can be acquired even in a case where it is difficult to read an image under image capturing conditions taught in advance.

In this embodiment, description has been given of an example in which the control device 30 included in the robot 10 is used to control an image capturing process performed by the robot 10. However, the image management server 50 may be configured to execute the image matching process, the pattern specifying process, and the process for setting image capturing conditions described above. In this case, the image management server 50 includes components similar to the image matching unit 37, the pattern specifying unit 38, the image capturing condition setting unit 39, and the registration unit 41 of the control device 30. Further, the pattern management DB 3005 and the image capturing condition management DB 3006 are stored in the storage unit 5000 of the image management server 50. In this case, the image management server 50 is an example of an information processing apparatus.

Conclusion

As described above, an information processing apparatus according to an embodiment of the present invention is an information processing apparatus (e.g., the control device 30) for controlling an image capturing process for the robot 10 (an example of a mobile machine) that moves in a predetermined site to capture an image of a target object (e.g., an inspection target object). The information processing apparatus includes the storage unit 3000 (an example of storage means) that stores a plurality of reference images that are captured images of the target object installed in the site, the captured images being obtained at a specific image capturing position and showing different appearances of the target object, such that each of the plurality of reference images is associated with an image capturing condition of the target object, the image capturing control unit 36 (an example of image capturing control means) that captures an image of the target object by using the robot 10 moved to the specific image capturing position, and the image capturing condition setting unit 39 (an example of image capturing condition setting means) that sets an image capturing condition of the target object, based on the captured image of the target object and the stored reference images. The image capturing control unit 36 captures an image of the target object by using the set image capturing condition. With this configuration, the information processing apparatus can acquire a captured image from which the state of the target object can be checked, regardless of the image capturing environment.

In the information processing apparatus according to the embodiment of the present invention, the target object includes the test object 6 (an example of a first target object) and an inspection target object (an example of a second target object). The information processing apparatus stores a plurality of reference images that are captured images of the test object 6 installed in the site, the captured images being obtained at the specific image capturing position and showing different appearances of the test object 6, such that each of the plurality of reference images is associated with an image capturing condition of the inspection target object, and captures an image of the test object 6 by using the robot 10 (an example of a mobile machine) moved to the specific image capturing position. The information processing apparatus sets an image capturing condition of the inspection target object, based on the captured image of the test object 6 and the stored reference images. With this configuration, the information processing apparatus captures an image of the inspection target object by using image capturing conditions corresponding to an image capturing environment such as sunlight conditions that change with the inspection time of day or the weather. This makes it possible to acquire a captured image from which the state of the inspection target object can be checked even in a case where it is difficult to read an image under image capturing conditions taught in advance.

Further, an image capturing system according an embodiment of the present invention is the image capturing system 1 including the communication terminal 70 that displays an image captured by the robot 10 (an example of a mobile machine). The communication terminal 70 includes the display control unit 73 (an example of display control means) that causes the display 706 (an example of a display unit) to display the captured image 610 (an example of an overhead-view image) in which an inspection area (an example of a predetermined area) including a plurality of inspection target objects (an example of a second target object) appears, the captured image 610 being captured by the image capturing control unit 36 (an example of image capturing control means), and the acceptance unit 72 (an example of acceptance means) that accepts designation of a predetermined region of the displayed captured image 610. In the image capturing system 1, the image capturing control unit 36 captures an image of a specific inspection target object included in the designated predetermined region, and the storage unit 3000 (an example of storage means) stores an image capturing condition under which the image of the specific inspection target object is captured, in association with the captured image of the test object 6 (an example of a first target object), the captured image of the test object 6 being captured by the image capturing control unit 36. With this configuration, the image capturing system 1 can register a captured image of the test object 6 and an image capturing condition corresponding to the image capturing environment in which an image of an inspection target object is captured, in association with each other. Further, the image capturing system 1 repeatedly performs the process of registering date and time image capturing conditions under different image capturing environments, and thus can register image capturing conditions under which an inspection target object corresponding to each of various image capturing environments is easily viewable.

Further, an image capturing system according to an embodiment of the present invention is the image capturing system 1 including the communication terminal 70 that displays an image captured by the robot 10 (an example of a mobile machine). The communication terminal 70 includes the display control unit 73 (an example of display control means) that causes the display 706 (an example of a display unit) to display a plurality of captured images 820 of the inspection target object (an example of a second target object), the plurality of captured images 820 being captured by the image capturing control unit 36 (an example of image capturing control means), and the acceptance unit 72 (an example of acceptance means) that accepts selection of a specific captured image (e.g., the captured image 820*a*) among the plurality of displayed captured images 820. In the image capturing system 1, the storage unit 3000 (an example of storage means) stores an image capturing condition of the specific captured image in association with the captured image of the test object 6 (an example of a first target object), the captured image of the test object 6 being captured by the image capturing control unit 36 (an example of image capturing control means). Accordingly, in the image capturing system 1, once the administrator registers image capturing conditions for inspection target objects, the robot 10 can capture images of the inspection target objects while automatically circulating through the moving route, thereby reducing the labor of the administrator for the registration work.

Supplemental Remarks

Each of the functions in the embodiments described above may be implemented by one or more processing circuits or circuitry. In this embodiment, the term "processing circuit or circuitry" includes a processor programmed to execute each function using software, such as a processor implemented by an electronic circuit, and devices designed to execute the functions described above, such as an application specific integrated circuit (ASIC), a digital signal processor (DSP), a field programmable gate array (FPGA), a system on a chip (SOC), a graphics processing unit (GPU), and a conventional circuit module.

Each of the tables in the embodiment described above may be generated by learning effect of machine learning. In addition, in alternative to the use of the tables, the data of the items associated with each other may be classified by machine learning. Machine learning is a technology for making a computer acquire human-like learning ability. Machine learning refers to a technology in which a computer autonomously generates an algorithm required for determination such as data identification from training data captured in advance and applies the generated algorithm to new data to make a prediction. Any suitable learning method is applied for machine learning. For example, any one of supervised learning, unsupervised learning, semi-supervised learning, reinforcement learning, and deep learning, or a combination of these learning methods may be used.

While an information processing apparatus, a mobile machine, an image capturing system, an image capturing control method, and a program according to embodiments of the present invention have been described, the present invention is not limited to the embodiments described above, and additional embodiments may be implemented, or certain components may be changed or omitted so long as such changes can be conceived by a person skilled in the art and achieve the operation and effect of the present invention in any aspect within the scope of the present invention.

This patent application is based on and claims priority to Japanese Patent Application Nos. 2020-165537 filed on Sep. 30, 2020, and 2021-117332 filed on Jul. 15, 2021, in the Japan Patent Office, the entire disclosure of which is hereby incorporated by reference herein.

REFERENCE SIGNS LIST

1 image capturing system
6 test object (example of first target unit)
100 communication network
10 robot (example of mobile machine)
30 control device (example of information processing apparatus)
31 transmission and reception unit
36 image capturing control unit (example of image capturing control means)
37 image matching unit (example of image matching means)
38 pattern specifying unit (example of pattern specifying means)
39 image capturing condition setting unit (example of image capturing condition setting means)
50 image management server (example of information processing apparatus)
70 communication terminal
72 acceptance unit (example of acceptance means)
73 display control unit (example of display control means)
706 display (example of display unit)
3000 storage unit (example of storage means)

The invention claimed is:

1. An information processing apparatus, comprising:

a memory which stores a reference image for a test object, the reference image being captured at a specific image capturing position, such that the reference image is associated with an image capturing condition information; and processing circuitry configured to, for each meter of a plurality of meters:

specify an image capturing pattern associated with the reference image, wherein the image capturing pattern is indicated in the image capturing condition information;

control a mobile machine to move to an image capturing position for the meter according to the image capturing pattern;

set an image capturing condition corresponding to the image capturing position and according to the image capturing pattern, and control the mobile machine to, at the image capturing position and according to the image capturing condition, capture of an image of the meter such that a value of the meter is readable in the image.

2. The information processing apparatus according to claim 1, wherein the memory stores a plurality of reference images showing different appearances of the test object, such that each of the plurality of reference images is associated with an image capturing condition of a corresponding meter of the plurality of meters.

3. The information processing apparatus according to claim 1, wherein the memory stores each of a plurality of reference images of the meter under different sunlight conditions, and the image capturing condition is based on the sunlight conditions corresponding to the reference images, in association with each other.

4. The information processing apparatus according to claim 1, wherein the processing circuitry is further configured to perform image matching between the captured image of the meter and the reference image, and specify the image capturing pattern according to the image matching.

5. The information processing apparatus according to claim 1, wherein the image capturing condition includes an image capturing position and an image capturing direction in which an image of the meter is captured.

6. The information processing apparatus according to claim 1, wherein the plurality of meters includes a first meter and a second meter, the memory stores a plurality of reference images that are captured images of the first meter installed in a site, the captured images being obtained at the specific image capturing position and showing different appearances of the first meter, such that each of the plurality of reference images is associated with an image capturing condition of the second meter, and the processing circuitry is further configured to control capture of an image of the first meter by using the mobile machine moved to the specific image capturing position, set an image capturing condition of the second meter, based on the captured image of the first meter and the stored reference images, and control capture of an image of the second meter by using the set image capturing condition.

7. The information processing apparatus according to claim 6, wherein the first meter includes a test object different from the second meter installed at the site.

8. A mobile machine comprising the information processing apparatus according to claim 1.

9. An image capturing system, comprising:

a mobile machine; and an information processing apparatus including:

a memory which stores a reference image for a test object, the reference image being captured at a specific image capturing position, such that the reference image is associated with an image capturing condition information; and processing circuitry configured to, for each meter of a plurality of meters:

specify an image capturing pattern associated with the reference image, wherein the image capturing pattern is indicated in the image capturing condition information;

control the mobile machine to move to an image capturing position for the meter according to the image capturing pattern, set an image capturing condition corresponding to the image capturing position and according to the image capturing pattern; and control the mobile machine to, at the image capturing position and according to the image capturing condition, capture of the image of the meter such that a value of the meter is readable in the image.

10. The image capturing system according to claim 9, wherein the memory stores a plurality of reference images showing different appearances of the test object, such that each of the plurality of reference images is associated with an image capturing condition of a corresponding meter of the plurality of meters.

11. The image capturing system according to claim 9, wherein the plurality of meters includes a first meter and a second meter, the memory stores a plurality of reference images that are captured images of the first meter installed in a site, the captured images being obtained at the specific image capturing position and showing different appearances of the first meter, such that each of the plurality of reference images is associated with an image capturing condition of the second meter, and the processing circuitry is further configured to control capture of an image of the first meter by using the mobile machine moved to the specific image capturing position, set an image capturing condition of the second meter, based on the captured image of the first meter and the reference images stored in the memory, and control capture of an image of the second meter by using the set image capturing condition.

12. The image capturing system according to claim 11, further comprising:

a communication terminal configured to display an image captured by the mobile machine, wherein the communication terminal includes circuitry configured to control a display to display an overhead-view image in which a predetermined area including a plurality of the second meters appears, and accept designation of a predetermined region of the displayed overhead-view image, the processing circuitry controls capture of an image of a specific second meter included in the designated predetermined region, and the memory stores an image capturing condition under which the image of the specific second meter is captured, in association with the captured image of the first meter.

13. The image capturing system according to claim 11, further comprising:

a communication terminal configured to display an image captured by the mobile machine, wherein the communication terminal includes circuitry configured to control a display to display a plurality of captured images of the second meter, and receive selection of a specific captured image among the plurality of displayed captured images, and the memory stores an image capturing condition of the specific captured image in association with the captured image of the first meter.

14. A non-transitory computer readable medium storing computer executable instructions which, when executed by an information processing apparatus cause the information processing apparatus to:

store a reference image for a test object, the reference image being captured at a specific image capturing position, such that the reference image is associated with an image capturing condition information; and for each meter of a plurality of meters:

specify an image capturing pattern associated with the reference image, wherein the image capturing pattern is indicated in the image capturing condition information;

control a mobile machine to move to an image capturing position for the meter according to the image capturing pattern;

set an image capturing condition corresponding to the image capturing position and according to the image capturing pattern; and control the mobile machine to, at the image capturing position and according to the image capturing condition, capture an image of the meter such that a value of the meter is readable in the image.

* * * * *